(12) United States Patent
Tsuda

(10) Patent No.: US 12,695,471 B2
(45) Date of Patent: Jul. 28, 2026

(54) RADIO FREQUENCY CIRCUIT AND COMMUNICATION DEVICE

(71) Applicant: Murata Manufacturing Co., Ltd., Nagaokakyo (JP)

(72) Inventor: Motoji Tsuda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 379 days.

(21) Appl. No.: 18/491,815

(22) Filed: Oct. 23, 2023

(65) Prior Publication Data

US 2024/0048163 A1 Feb. 8, 2024

Related U.S. Application Data

(63) Continuation of application No. PCT/JP2022/011472, filed on Mar. 15, 2022.

(30) Foreign Application Priority Data

Apr. 26, 2021 (JP) ................................. 2021-074182

(51) Int. Cl.
H04B 1/00 (2006.01)
H04B 1/04 (2006.01)
H04B 7/0413 (2017.01)

(52) U.S. Cl.
CPC ............. H04B 1/0078 (2013.01); H04B 1/04 (2013.01); H04B 7/0413 (2013.01); H04B 2001/0408 (2013.01)

(58) Field of Classification Search
CPC ...... H04B 1/0078; H04B 1/04; H04B 7/0413; H04B 2001/0408; H04B 1/0057; H04B 1/00
See application file for complete search history.

(56) References Cited

U.S. PATENT DOCUMENTS

2018/0294858 A1* 10/2018 Pehlke ...................... H04B 1/40
2019/0074819 A1* 3/2019 Goto ..................... H03H 9/6489

FOREIGN PATENT DOCUMENTS

CN 108880490 A 11/2018
CN 110401421 A 11/2019
(Continued)

OTHER PUBLICATIONS

International Search Report and Written Opinion mailed on Jun. 14, 2022, received for PCT Application PCT/JP2022/011472, filed on Mar. 15, 2022, 9 pages including English Translation.
(Continued)

*Primary Examiner* — Ayodeji O Ayotunde
(74) *Attorney, Agent, or Firm* — XSENSUS LLP

(57) ABSTRACT

A radio frequency circuit performs MIMO transmission in a band A and uplink communications in the band A and a band B and includes a power amplifier that amplifies a signal in the band A; a power amplifier that amplifies signals in the bands A and B; a filter that has a pass band including the band A; a filter that has a pass band including the band B; a filter that has a pass band including the band A; and a switch that simultaneously connects a terminal to a terminal and a terminal to a terminal and simultaneously connects the terminal to the terminal (32c) and the terminal to a terminal. The terminal is connected to the power amplifier, the terminal is connected to the power amplifier, the terminal is connected to the filter, the terminal is connected to the filter, and the terminal is connected to the filter.

19 Claims, 12 Drawing Sheets

(56) References Cited

FOREIGN PATENT DOCUMENTS

| | | | |
|---|---|---|---|
| JP | 2019-140671 | A | 8/2019 |
| WO | 2019/065419 | A1 | 4/2019 |
| WO | 2021/039067 | A1 | 3/2021 |

OTHER PUBLICATIONS

Office Action issued on Jan. 29, 2026, in corresponding Chinese patent Application No. 202280031125.3, 17 pages.

* cited by examiner

FIG. 6A

SMITH CHART

FIG. 11

RADIO FREQUENCY CIRCUIT AND COMMUNICATION DEVICE

CROSS-REFERENCE TO RELATED APPLICATIONS

The present application is a continuation of PCT application PCT/JP2022/011472, filed Mar. 15, 2022, and claims priority to Japanese application JP 2021-074182, filed Apr. 26, 2021, the entire contents of each of which is incorporated herein by reference.

TECHNICAL FIELD

The present disclosure relates to a radio frequency circuit and a communication device.

BACKGROUND ART

Multiple-Input Multiple-Output (MIMO) technology is used for communication terminals such as mobile phones. MIMO is a technology that improves the communication speed by spatially multiplexing multiple signals using multiple antennas and transmitting and receiving the spatially-multiplexed signals.

Patent Document 1 discloses a radio frequency module including a primary or diversity first circuit and a second circuit for MIMO.

CITATION LIST

Patent Document

Patent Document 1: International Publication No. 2019/065419

SUMMARY

Technical Problems

However, with the radio frequency module (radio frequency circuit) disclosed in Patent Document 1, because a power amplifier is provided separately for each of the second circuit for MIMO and the primary or diversity first circuit, the circuit size increases, and the size of the radio frequency circuit increases.

The present disclosure is made to solve the above problem as well as other problems, and so one object of the present disclosure is to provide a radio frequency circuit and a communication device that are small and can transmit MIMO and non-MIMO radio frequency signals.

Solutions to Problems

One non-limiting aspect of the present disclosure provides a radio frequency circuit configured to perform uplink MIMO in a first band as well as simultaneous transmission of a signal in the first band and a signal in a second band. The radio frequency circuit includes a first power amplifier configured to amplify the signal in the first band; a second power amplifier configured to amplify the signal in the first band and the signal in the second band; a first filter having a pass band including at least a part of the first band; a second filter having another pass band including at least a part of the second band; a third filter that has a third pass band including at least a part of the first band and is different from the first filter; and a first switch that includes a first terminal, a second terminal, a third terminal, a fourth terminal, and a fifth terminal and is configured to simultaneously connect the first terminal to the third terminal and the second terminal to the fourth terminal and simultaneously connect the first terminal to the third terminal and the second terminal to the fifth terminal. The first terminal is connected to an output terminal of the first power amplifier; the second terminal is connected to an output terminal of the second power amplifier; the third terminal is connected to the first filter; the fourth terminal is connected to the second filter; and the fifth terminal is connected to the third filter.

Advantageous Effects of Disclosure

The present disclosure makes it possible, among other things, to provide a radio frequency circuit and a communication device that are small and can transmit MIMO and non-MIMO radio frequency signals.

BRIEF DESCRIPTION OF DRAWINGS

FIG. 6A is a circuit diagram of a radio frequency circuit and a communication device according to a variation of the first embodiment.

FIG. 11 is a circuit state diagram of the radio frequency circuit and the communication device in the case of uplink 4×4 MIMO according to the second embodiment.

DESCRIPTION OF EMBODIMENTS

Figure 1:
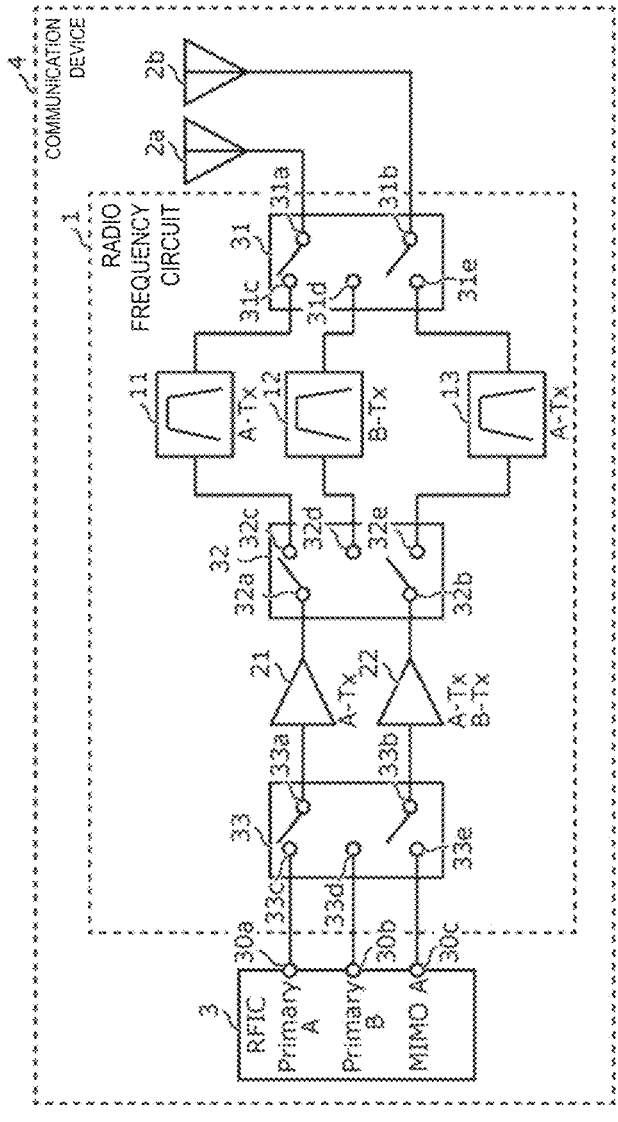
FIG. 1 is a circuit diagram of a radio frequency circuit and a communication device according to a first embodiment.

Embodiments of the present disclosure are described below with reference to the drawings. Each of the embodiments described below represents a general or specific example. Values, shapes, materials, components, and layouts and connection configurations of the components described in the embodiments below are just examples and are not intended to limit the present invention.

Each of the drawings is a schematic diagram in which components are emphasized or omitted and the ratios between the components are adjusted to facilitate the understanding of the present disclosure. That is, components in each of the drawings are not necessarily illustrated accurately; and the shapes, the positional relationships, and the ratios of the components may differ from the actual shapes, positional relationships, and ratios. The same reference number is assigned to substantially the same components in the drawings, and repeated descriptions of those components may be omitted or simplified.

In this disclosure, "connected" not only indicates that circuit elements are directly connected to each other with a connection terminal and/or a wire conductor but also indicates that the circuit elements are electrically connected to each other via another circuit element. Also, "connected between A and B" indicates that a component is disposed on a path connecting A to B and is connected to A and B.

Also, in this disclosure, a "transmission path" indicates a transmission line comprised of a wire through which a radio frequency transmission signal propagates, an electrode directly connected to the wire, and a terminal directly connected to the wire or the electrode.

Furthermore, in this disclosure, "a component is disposed over a substrate" may indicate that the component is disposed on the major surface of the substrate, the component is disposed in the substrate, or the component is disposed above the major surface of the substrate without contacting the major surface (e.g., the component is stacked on another component disposed to contact the major surface).

First Embodiment

[1 Circuit Configurations of Radio Frequency Circuit 1 and Communication Device 4]

Circuit configurations of a radio frequency circuit 1 and a communication device 4 according to a first embodiment are described below with reference to FIG. 1. FIG. 1 is a circuit diagram of the radio frequency circuit 1 and the communication device 4 according to the first embodiment.

[1.1 Circuit Configuration of Communication Device 4]

First, a circuit configuration of the communication device 4 is described. As illustrated in FIG. 1, the communication device 4 of the present embodiment includes a radio frequency circuit 1, antennas 2a and 2b, and an RF signal processing circuit (RFIC, RF integrated circuit) 3.

The radio frequency circuit 1 transmits radio frequency signals between the antennas 2a and 2b and the RFIC 3. The detailed circuit configuration of the radio frequency circuit 1 is described later.

The antennas 2a and 2b are examples of a first antenna and a second antenna, respectively. The antennas 2a and 2b are connected to a switch 31 of the radio frequency circuit 1, transmit radio frequency signals output from the radio frequency circuit 1, receive radio frequency signals from the outside, and output the received radio frequency signals to the radio frequency circuit 1.

The RFIC 3 is an example of a signal processing circuit that processes radio frequency signals. Specifically, the RFIC 3 performs signal processing, such as down converting, on a reception signal input via a reception path of the radio frequency circuit 1 and outputs a reception signal generated by the signal processing to a baseband signal processing circuit (BBIC, baseband integrated circuit) (not shown). Also, the RFIC 3 performs signal processing, such as up-converting, on a transmission signal input from the BBIC and outputs a transmission signal generated by the signal processing to a transmission path of the radio frequency circuit 1. The RFIC 3 includes a control unit (i.e., the control unit is at least part of the RFIC circuitry) that controls, for example, switches and amplifiers of the radio frequency circuit 1. Some or all of the functions of the control unit of the RFIC 3 may be provided outside of the RFIC 3 and may be implemented by, for example, a component in the BBIC or the radio frequency circuit 1.

The RFIC 3 includes terminals 30a, 30b, and 30c. The terminal 30a outputs a primary signal and a MIMO signal in a band A to the radio frequency circuit 1. The terminal 30b outputs a primary signal in a band B to the radio frequency circuit 1. The terminal 30c outputs a MIMO signal in the band A to the radio frequency circuit 1.

In the communication device 4 according to the present embodiment, the antennas 2a and 2b are optional components.

[1.2 Circuit Configuration of Radio Frequency Circuit 1]

Next, a circuit configuration of the radio frequency circuit 1 is described. As illustrated in FIG. 1, the radio frequency circuit 1 includes filters 11, 12, and 13, power amplifiers 21 and 22, and switches 31, 32, and 33.

The filter 11 is an example of a first filter that has a pass band including at least a part of the band A (first band). The filter 11 is connected between the switches 31 and 32.

The filter 12 is an example of a second filter that has a pass band including at least a part of the band B (second band). The filter 12 is connected between the switches 31 and 32.

The filter 13 is an example of a third filter that has a pass band including at least a part of the band A (first band). The filter 13 differs from the filter 11. The filter 13 is connected between the switches 31 and 32.

In embodiments in which the band A is used for frequency division duplex (FDD), the pass band of each of the filters 11 and 13 includes an uplink operating band of the band A. In embodiments in which the band A is used for time division duplex (TDD), the pass band of each of the filters 11 and 13 includes the band A.

In embodiments in which the band B is used for FDD, the pass band of the filter 12 includes an uplink operating band of the band B. In embodiments in which the band B is used for TDD, the pass band of the filter 12 includes the band B.

Here, an uplink operating band indicates a frequency range included in a band and designated for uplink. Also, a downlink operating band indicates a frequency range included in a band and designated for downlink.

The power amplifier 21 is an example of a first power amplifier and is capable of amplifying a transmission signal that is in the band A and input from the RFIC 3 via the switch 33. The power amplifier 21 is connected between the switches 32 and 33.

The power amplifier 22 is an example of a second power amplifier and is capable of amplifying transmission signals that are in the bands A and B and input from the RFIC 3 via the switch 33. The power amplifier 22 is connected between the switches 32 and 33.

Each of the bands A and B indicates a frequency band predefined by, for example, a standards body (e.g., 3GPP or the Institute of Electrical and Electronics Engineers (IEEE)) for a communication system constructed using a radio access technology (RAT). In the present embodiment, the communication system may be, for example, but is not limited to, a 4th Generation (4G)-Long Term Evolution (LTE) system, a 5th Generation (5G)-New Radio (NR) system, or a wireless local area network (WLAN) system.

The band A belongs to, for example, a high band group (2.4-2.8 GHz), and the band B belongs to, for example, a middle band group (1.5-2.4 GHz). More specifically, the band A is, for example, Band 41 (2496-2690 MHz), and the band B is, for example, Band 40 (2300-2400 MHz).

The switch 32 is an example of a first switch and includes a terminal 32a (first terminal), a terminal 32b (second terminal), a terminal 32c (third terminal), a terminal 32d (fourth terminal), and a terminal 32e (fifth terminal). The terminal 32a is connected to the output terminal of the power amplifier 21, the terminal 32b is connected to the output terminal of the power amplifier 22, the terminal 32c is connected to the input terminal of the filter 11, the terminal 32d is connected to the input terminal of the filter 12, and the terminal 32e is connected to the input terminal of the filter 13.

The switch 32 has a multiple-connection configuration. That is, the switch 32 can simultaneously connect the terminal 32a to the terminal 32c and the terminal 32b to the terminal 32d and can simultaneously connect the terminal 32a to the terminal 32c and the terminal 32b to the terminal 32e. The switch 32 is, for example, a Double Pole 3 Throw (DP3T) switch circuit.

The switch 33 is an example of a second switch and includes a terminal 33a (sixth terminal), a terminal 33b (seventh terminal), a terminal 33c (eighth terminal), a terminal 33d (ninth terminal), and a terminal 33e (tenth terminal). The terminal 33a is connected to the input terminal of the power amplifier 21, and the terminal 33b is connected to the input terminal of the power amplifier 22. The terminal 33c is connected to the terminal 30a of the RFIC 3 and receives a primary signal or a MIMO signal in the band A. The terminal 33d is connected to the terminal 30b of the RFIC 3 and receives a primary signal in the band B. The terminal 33e is connected to the terminal 30c of the RFIC 3 and receives a MIMO signal in the band A.

The switch 33 has a multiple-connection configuration. That is, the switch 33 can simultaneously connect the terminal 33a to the terminal 33c and the terminal 33b to the terminal 33d and can simultaneously connect the terminal 33a to the terminal 33c and the terminal 33b to the terminal 33e. The switch 33 is, for example, a DP3T switch circuit.

The switch 31 is an example of a third switch and includes a terminal 31a (first antenna connection terminal), a terminal 31b (second antenna connection terminal), a terminal 31c (sixteenth terminal), a terminal 31d (seventeenth terminal), and a terminal 31e (eighteenth terminal). The terminal 31a is connected to the antenna 2a, the terminal 31b is connected to the antenna 2b, the terminal 31c is connected to the output terminal of the filter 11, the terminal 31d is connected to the output terminal of the filter 12, and the terminal 31e is connected to the output terminal of the filter 13.

The switch 31 has a multiple-connection configuration. That is, the switch 31 can simultaneously connect the terminal 31a to the terminal 31c and the terminal 31b to the terminal 31d and can simultaneously connect the terminal 31a to the terminal 31c and the terminal 31b to the terminal 31e. The switch 31 is, for example, a DP3T switch circuit.

The switch 32 may be formed as a semiconductor integrated circuit (IC). Also, the switches 31 and 33 may be included in this semiconductor IC. This configuration makes it possible to reduce the sizes and the heights of the switches 31, 32, and 33. The semiconductor IC may be implemented by, for example, a complementary metal oxide semiconductor (CMOS). Specifically, the semiconductor IC is formed by a silicon-on-insulator (SOI) process. This makes it possible to manufacture the semiconductor IC at a low cost. The semiconductor IC may be comprised of at least one of GaAs, SiGe, and GaN. This makes it possible to output a radio frequency signal with high-quality amplification performance and noise performance.

With the above configurations, the radio frequency circuit 1 and the communication device 4 can perform uplink MIMO in the band A and simultaneous transmission of a signal in the band A and a signal in the band B. The uplink MIMO in the band A and the simultaneous transmission of signals in the bands A and B are implemented by, for example, the switches 31 to 33 each of which has a multiple-connection configuration.

[1.3 Circuit Configurations of Radio Frequency Circuit and Communication Device According to Comparative Example]

Figure 2:
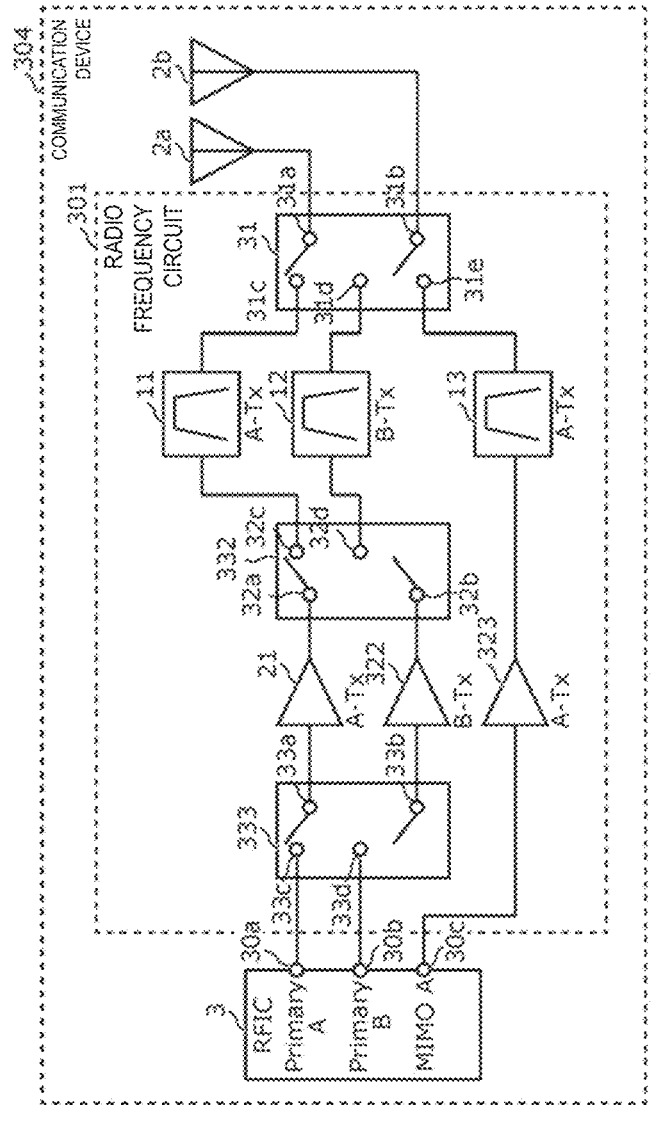
FIG. 2 is a circuit diagram of a radio frequency circuit and a communication device according to a comparative example.

A circuit configuration of a comparative example, which corresponds to a related-art technology, is described below. FIG. 2 is a circuit diagram of a radio frequency circuit 301 and a communication device 304 according to a comparative example. The communication device 304 includes the radio frequency circuit 301, antennas 2a and 2b, and an RFIC 3. The communication device 304 of the comparative example differs from the communication device 4 of the first embodiment in the circuit configuration of the radio frequency circuit 301. The radio frequency circuit 301 includes filters 11, 12, and 13, power amplifiers 21, 322, and 323, and switches 31, 332, and 333. The radio frequency circuit 301 of the comparative example differs from the radio frequency circuit 1 of the first embodiment in that the radio frequency circuit 301 includes three power amplifiers and in the connection configuration of the three power amplifiers and the switches. Below, descriptions of components of the radio frequency circuit 301 of the comparative example corresponding to the components of the radio frequency circuit 1 of the first embodiment are omitted, and differences between the radio frequency circuit 301 and the radio frequency circuit 1 are mainly described.

The power amplifier 21 is capable of amplifying a transmission signal that is in the band A and input from the RFIC 3 via the switch 333. The power amplifier 21 is connected between the switches 332 and 333.

The power amplifier 322 is capable of amplifying a transmission signal that is in the band B and input from the RFIC 3 via the switch 333. The power amplifier 322 is connected between the switches 332 and 333.

The power amplifier 323 is capable of amplifying a transmission signal that is in the band A and input from the RFIC 3. The power amplifier 323 is not connected to the switches 332 and 333, but is connected between the filter 13 and the RFIC 3.

The switch 332 includes four terminals. A first terminal of the switch 332 is connected to the output terminal of the power amplifier 21, a second terminal of the switch 332 is connected to the output terminal of the power amplifier 322, a third terminal of the switch 332 is connected to the input terminal of the filter 11, and a fourth terminal of the switch 332 is connected to the input terminal of the filter 12.

The switch 332 is configured to be able to simultaneously connect the first terminal to the third terminal and the second terminal to the fourth terminal.

The switch 333 includes four terminals. A first terminal of the switch 333 is connected to the input terminal of the power amplifier 21, and a second terminal of the switch 333 is connected to the input terminal of the power amplifier 322. A third terminal of the switch 333 is connected to the terminal 30a of the RFIC 3 and receives a primary signal or a MIMO signal in the band A. A fourth terminal of the switch 333 is connected to the terminal 30b of the RFIC 3 and receives a primary signal in the band B.

The switch 333 is configured to be able to simultaneously connect the first terminal to the third terminal and the second terminal to the fourth terminal.

The input terminal of the power amplifier 323 is connected to the terminal 30c of the RFIC 3, and the output terminal of the power amplifier 323 is connected to the input terminal of the filter 13. The power amplifier 323 receives a MIMO signal in the band A.

With the above configuration, the radio frequency circuit 301 and the communication device 304 can perform uplink MIMO transmission in the band A and simultaneous transmission of a signal in the band A and a signal in the band B.

In the radio frequency circuit 301 of the comparative example, the power amplifier 322 amplifies only the band B out of the bands A and B. Therefore, the power amplifier 323 for amplifying a MIMO signal in the band A needs to be provided separately.

In contrast, in the radio frequency circuit 1 of the first embodiment, the power amplifier 22 serves both as a power amplifier that amplifies a MIMO signal in the band A and a power amplifier that amplifies a primary signal in the band B. This configuration makes it possible to reduce the number of power amplifiers in the radio frequency circuit 1 and thereby makes it possible to reduce the size of the radio frequency circuit 1.

[1.4 Circuit Connection States of Radio Frequency Circuit 1]

Next, circuit connection states of the radio frequency circuit 1 corresponding to signal transmission modes are described. Signal transmission modes supported by the radio frequency circuit 1 of the present embodiment include: (1) independent transmission of a primary signal in the band A, (2) independent transmission of a primary signal in the band B, (3) simultaneous transmission (uplink 2CA) of a primary signal in the band A and a primary signal in the band B, and (4) MIMO transmission (uplink 2×2 MIMO) in the band A.

Figure 3:
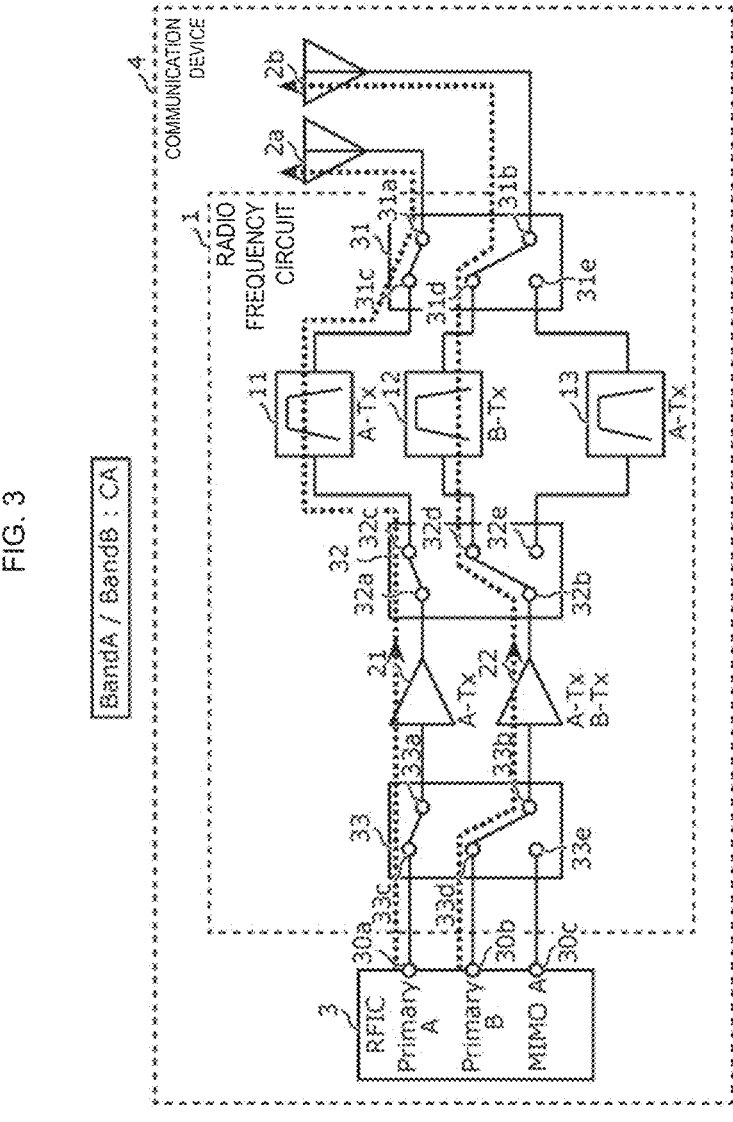
FIG. 3 is a circuit state diagram of the radio frequency circuit and the communication device in the case of uplink 2 carrier aggregation (2CA) according to the first embodiment.
Figure 4:
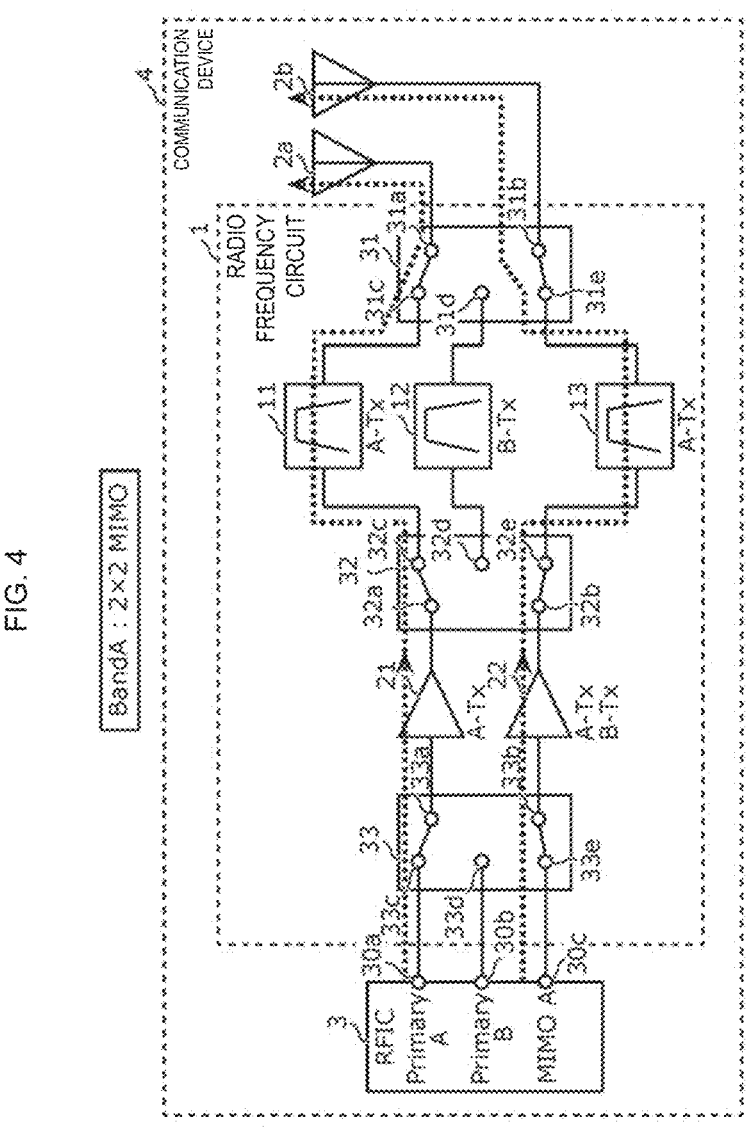
FIG. 4 is a circuit state diagram of the radio frequency circuit and the communication device in the case of uplink 2×2 MIMO according to the first embodiment.

FIG. 3 is a circuit state diagram of the radio frequency circuit 1 and the communication device 4 in the case of uplink 2CA according to the first embodiment. FIG. 4 is a circuit state diagram of the radio frequency circuit 1 and the communication device 4 in the case of uplink 2×2 MIMO according to the first embodiment.

First, (1) when a primary signal in the band A is transmitted independently, in FIG. 1, the terminal 33a is connected to the terminal 33c, the terminal 32a is connected to the terminal 32c, and the terminal 31a is connected to the terminal 31c. In this case, a transmission signal in the band A is transmitted through a transmission path formed by the RFIC 3, the switch 33, the power amplifier 21, the switch 32, the filter 11, the switch 31, and the antenna 2a.

Next, (2) when a primary signal in the band B is transmitted independently, in FIG. 1, the terminal 33b is connected to the terminal 33d, the terminal 32b is connected to the terminal 32d, and the terminal 31a is connected to the terminal 31d. In this case, a transmission signal in the band B is transmitted through a transmission path formed by the RFIC 3, the switch 33, the power amplifier 22, the switch 32, the filter 12, the switch 31, and the antenna 2a.

Next, (3) in the case of uplink 2CA of a primary signal in the band A and a primary signal in the band B, as illustrated in FIG. 3, the terminal 33a is connected to the terminal 33c, the terminal 32a is connected to the terminal 32c, and the terminal 31a is connected to the terminal 31c. At the same time, the terminal 33b is connected to the terminal 33d, the terminal 32b is connected to the terminal 32d, and the terminal 31b is connected to the terminal 31d. In this case, the primary signal in the band A is transmitted through a transmission path formed by the RFIC 3, the switch 33, the power amplifier 21, the switch 32, the filter 11, the switch 31, and the antenna 2a; and at the same time, the primary signal in the band B is transmitted through a transmission path formed by the RFIC 3, the switch 33, the power amplifier 22, the switch 32, the filter 12, the switch 31, and the antenna 2b.

Next, (4) in the case of MIMO transmission (uplink 2×2 MIMO) in the band A, as illustrated in FIG. 4, the terminal 33a is connected to the terminal 33c, the terminal 32a is connected to the terminal 32c, and the terminal 31a is connected to the terminal 31c. At the same time, the terminal 33b is connected to the terminal 33e, the terminal 32b is connected to the terminal 32e, and the terminal 31b is connected to the terminal 31e. In this case, a MIMO signal in the band A is transmitted through a transmission path formed by the RFIC 3, the switch 33, the power amplifier 21, the switch 32, the filter 11, the switch 31, and the antenna 2a; and at the same time, a MIMO signal in the band A is transmitted through a transmission path formed by the RFIC 3, the switch 33, the power amplifier 22, the switch 32, the filter 13, the switch 31, and the antenna 2b.

Here, in the switch 32, when the terminal 32b is connected to the terminal 32e, the terminal 32a is always connected to the terminal 32c. Also, in the switch 33, when the terminal 33b is connected to the terminal 33e, the terminal 33a is always connected to the terminal 33c. The filter 13 is dedicated for 2×2 MIMO. Therefore, when the filter 13 is used, the filter 11 is always used for 2×2 MIMO.

[1.5 Module Configuration of Radio Frequency Circuit 1]

In the radio frequency circuit 1 according to the present embodiment, the power amplifiers 21 and 22 and the switch 32 are disposed over the same first substrate.

This configuration makes it possible to shorten signal lines connecting the power amplifiers 21 and 22 to the switch 32 and thereby makes it possible to reduce the transmission loss of high-power transmission signals output from the power amplifiers 21 and 22. This in turn makes it possible to reduce the power consumption of the radio frequency circuit 1.

The switches 31 and 33 may also be disposed over the first substrate together with the switch 32. Also, the switches 31, 32, and 33 may be included in the same semiconductor IC. This makes it possible to reduce the size of the radio frequency circuit 1.

Figure 5:
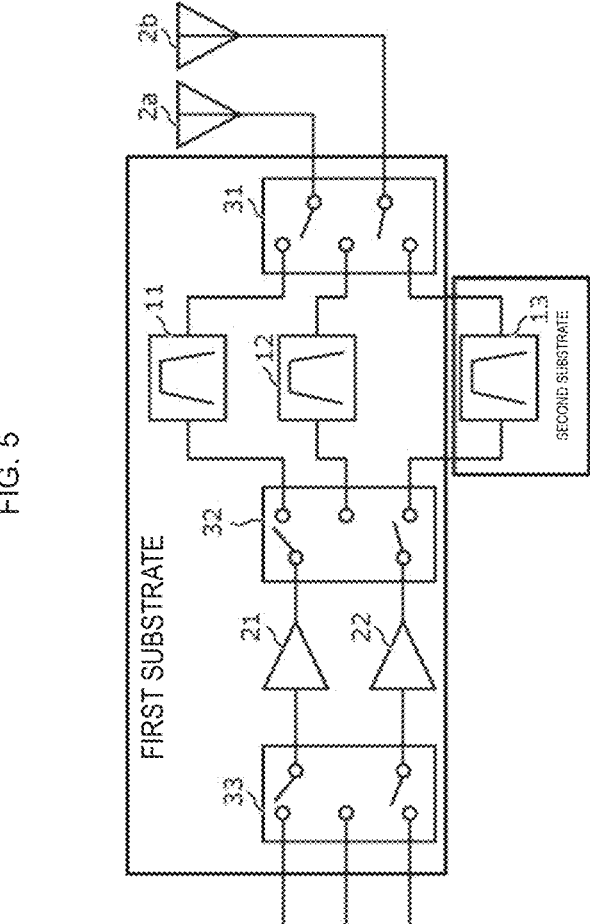
FIG. 5 is a diagram illustrating a module configuration of the radio frequency circuit according to the first embodiment.

Also, as in a module configuration of the radio frequency circuit 1 illustrated in FIG. 5, the filters 11 and 12 may be disposed over the first substrate in addition to the power amplifiers 21 and 22 and the switches 31 through 33. On the other hand, the filter 13 may be disposed over a second substrate different from the first substrate. This configuration makes it possible to use the radio frequency circuit 1 as a MIMO-capable module in which the filter 13 is enabled and a primary module in which the filter 13 is disabled by electrically connecting and disconnecting the first substrate to and from the second substrate.

Also, in the radio frequency circuit 1 according to the present embodiment, the filters 11 through 13 may be disposed over the first substrate in addition to the power amplifiers 21 and 22 and the switches 31 through 33. This makes it possible to use the radio frequency circuit 1 as a small MIMO-capable module.

This configuration makes it possible to shorten the transmission paths from the power amplifiers 21 and 22 to the switch 31 and thereby makes it possible to further reduce the transmission loss of high-power transmission signals output from the power amplifiers 21 and 22. Also, this configuration makes it possible to reduce the size of the radio frequency circuit 1.

[1.6 Circuit Configuration of Radio Frequency Circuit 1A According to Variation]

Figure 6A:
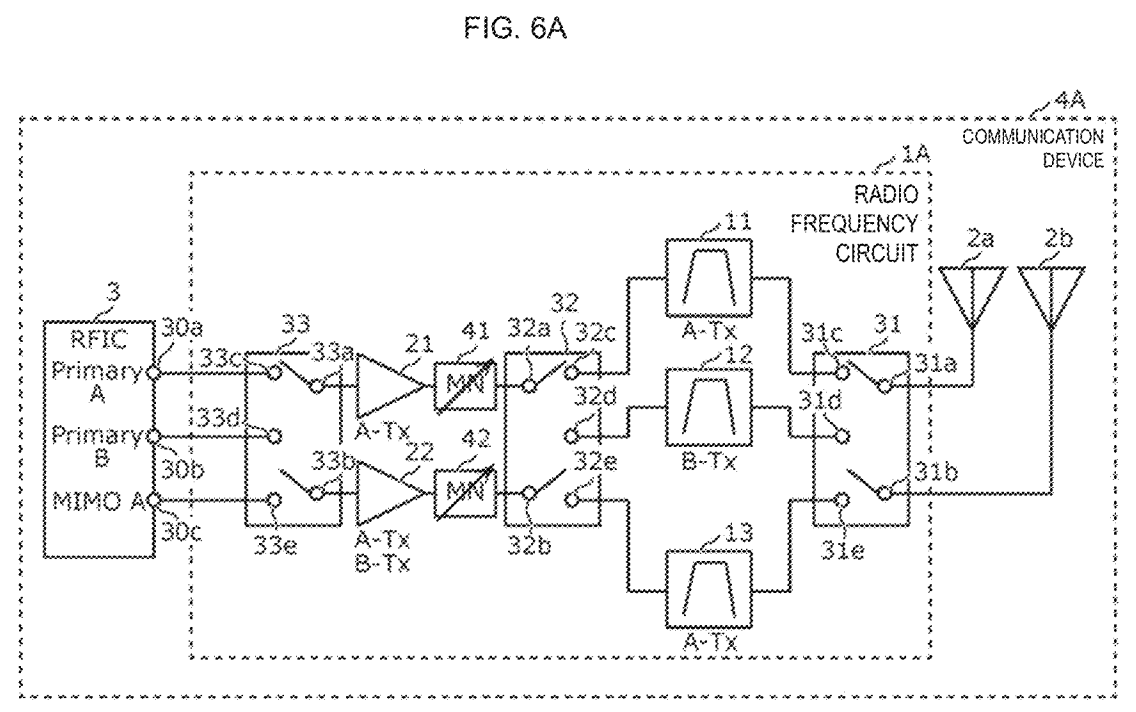

FIG. 6A is a circuit diagram of a communication device 4A and a radio frequency circuit 1A according to a variation of the first embodiment. The communication device 4A includes the radio frequency circuit 1A, antennas 2a and 2b, and an RFIC 3. The communication device 4A according to this variation differs from the communication device 4 according to the first embodiment in the circuit configuration of the radio frequency circuit 1A. The radio frequency circuit 1A includes filters 11, 12, and 13, power amplifiers 21 and 22, switches 31, 32, and 33, and matching circuits 41 and 42. The radio frequency circuit 1A according to this variation differs from the radio frequency circuit 1 according to the first embodiment in that the matching circuits 41 and 42 are provided. Below, descriptions of components of the radio frequency circuit 1A of this variation corresponding to the components of the radio frequency circuit 1 of the first embodiment are omitted, and differences between the radio frequency circuit 1A and the radio frequency circuit 1 are mainly described.

The matching circuit 41 is an example of a first matching circuit with variable impedance and is connected between the power amplifier 21 and the switch 32. The matching circuit 41 includes at least one of an inductor and a capacitor.

The matching circuit 42 is an example of a second matching circuit with variable impedance and is connected between the power amplifier 22 and the switch 32. The matching circuit 42 includes at least one of an inductor and a capacitor.

Figure 6B:
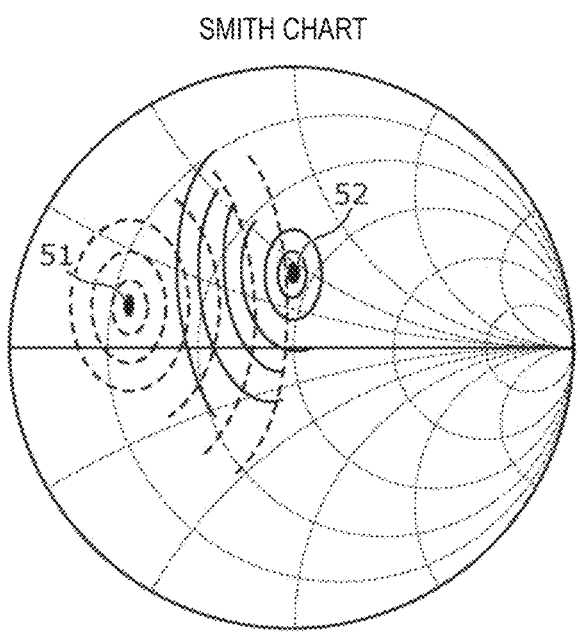
FIG. 6B is a Smith chart showing output impedance of each power amplifier according to the variation of the first embodiment.

FIG. 6B is a Smith chart showing output impedance of each of the power amplifiers 21 and 22 according to the variation of the first embodiment. FIG. 6B shows relationships among output impedance (impedance observed when the power amplifier 21 is seen from the output terminal of the power amplifier 21) of the power amplifier 21, the efficiency of the power amplifier 21, and an adjacent channel leakage power ratio (ACLR) of the power amplifier 21. FIG. 6B also shows relationships among output impedance (impedance observed when the power amplifier 22 is seen from the output terminal of the power amplifier 22) of the power amplifier 22, the efficiency of the power amplifier 22, and an adjacent channel leakage power ratio (ACLR) of the power amplifier 22. Solid lines indicate the distribution of efficiency with respect to the output impedance of each of the power amplifiers 21 and 22. In the efficiency distribution, the closer to the center, the higher the efficiency; and a maximum efficiency point 52 indicates the output impedance of each of the power amplifiers 21 and 22 at which the efficiency becomes maximum. Dotted lines indicate the distribution of ACLR with respect to the output impedance of each of the power amplifiers 21 and 22. In the ACLR distribution, the closer to the center, the smaller the ACLR; and a minimum ACLR point 51 indicates the output impedance of each of the power amplifiers 21 and 22 at which the ACLR becomes minimum. Here, the maximum efficiency point 52 and the minimum ACLR point 51 indicate different impedance values. Specifically, the impedance value indicated by the minimum ACLR point 51 is less than the impedance value indicated by the maximum efficiency point 52.

In independent transmission of a primary signal in the band A and independent transmission of a primary signal in the band B, the output power of each primary signal is, for example, about 26 dBm; and in uplink 2×2 MIMO in the band A, the output power of each MIMO signal is, for example, about 23 dBm.

In this point of view, in independent transmission of a primary signal in the band A, it is preferable to match the output impedance of the power amplifier 21 to a relatively low impedance to reduce the ACLR to prioritize the suppression of signal distortion of a high-power signal. On the other hand, in uplink 2×2 MIMO in the band A, it is preferable to match the output impedance of the power amplifier 21 to a relatively high impedance to prioritize the efficiency of a low-power signal.

In independent transmission of a primary signal in the band B, it is preferable to match the output impedance of the power amplifier 22 to a relatively low impedance to reduce the ACLR to prioritize the suppression of signal distortion of a high-power signal. On the other hand, in uplink 2×2 MIMO in the band A, it is preferable to match the output impedance of the power amplifier 22 to relatively high impedance to prioritize the efficiency of a low-power signal.

Thus, in the radio frequency circuit 1A and the communication device 4A according to this variation, the matching circuit 41 is preferably configured to have a first impedance when a primary signal in the band A out of the bands A and B is independently transmitted; and the matching circuit 41 is preferably configured to have a second impedance higher than the first impedance when uplink 2×2 MIMO in the band A is performed.

Also, the matching circuit 42 is preferably configured to have a third impedance when a primary signal in the band B out of the bands A and B is independently transmitted; and the matching circuit 42 is preferably configured to have a fourth impedance higher than the third impedance when uplink 2×2 MIMO in the band A is performed.

One of the matching circuits 41 and 42 may be omitted.

[1.7 Effects of Radio Frequency Circuit and Communication Device According to First Embodiment]

As described above, the radio frequency circuit 1 of the present embodiment can perform uplink MIMO in the band A and simultaneous transmission of a signal in the band A and a signal in the band B. The radio frequency circuit 1 includes the power amplifier 21 capable of amplifying the signal in the band A; the power amplifier 22 capable of amplifying the signal in the band A and the signal in the band B; the filter 11 that has a pass band including an uplink operating band of the band A; the filter 12 that has a pass band including an uplink operating band of the band B; the filter 13 that is different from the filter 11 and has a pass band including the uplink operating band of the band A; and the switch 32 that includes the terminals 32a, 32b, 32c, 32d, and 32e, can simultaneously connect the terminal 32a to the terminal 32c and the terminal 32b to the terminal 32d, and can simultaneously connect the terminal 32a to the terminal 32c and the terminal 32b to the terminal 32e. The terminal 32a is connected to the output terminal of the power amplifier 21, the terminal 32b is connected to the output terminal of the power amplifier 22, the terminal 32c is connected to the filter 11, the terminal 32d is connected to the filter 12, and the terminal 32e is connected to the filter 13.

With this configuration, it is not necessary to provide a power amplifier dedicated for MIMO signals in the band A, and the power amplifier 22 serves both as a power amplifier for amplifying MIMO signals in the band A and a power amplifier for amplifying primary signals in the band B. This configuration makes it possible to reduce the number of power amplifiers and thereby makes it possible to reduce the size of the radio frequency circuit 1. Thus, the present embodiment makes it possible to provide the radio frequency circuit 1 that is small and capable of transmitting MIMO and non-MIMO radio frequency signals.

For example, in the radio frequency circuit 1 of the present embodiment, the terminal 32a may be connected to the terminal 32c and the terminal 32b may be connected to the terminal 32e when uplink MIMO in the band A is performed; and the terminal 32a may be connected to the terminal 32c and the terminal 32a may be connected to terminal 32d when simultaneous transmission of a signal in the band A and a signal in the band B is performed.

This configuration makes it possible to achieve both uplink MIMO in the band A and uplink CA of signals in the bands A and B by the switching operation of the switch 32 and thereby makes it possible to simplify the radio frequency circuit 1.

For example, in the radio frequency circuit 1 according to the present embodiment, the terminal 32a may be connected to the terminal 32c when the terminal 32b is connected to the terminal 32e.

With this configuration, the filter 11 is always used when the filter 13 is used. Accordingly, the filter 13 can be used exclusively for 2×2 MIMO.

As another example, the radio frequency circuit 1 of the present embodiment may further include the switch 33 that includes the terminals 33a, 33b, 33c, 33d, and 33e, can simultaneously connect the terminal 33a to the terminal 33c and the terminal 33b to the terminal 33d, and can simultaneously connect the terminal 33a to the terminal 33c and the terminal 33b to the terminal 33e. The terminal 33a may be connected to the input terminal of the power amplifier 21, the terminal 33b may be connected to the input terminal of the power amplifier 22, the terminal 33c may be configured to receive a signal in the band A, the terminal 33d may be configured to receive a signal in the band B, and the terminal 33e may be configured to receive a signal in the band A.

For example, in the radio frequency circuit 1 of the present embodiment, the terminal 33a may be connected to the terminal 33c and the terminal 33b may be connected to the terminal 33e when uplink MIMO in the band A is performed; and the terminal 33a may be connected to the terminal 33c and the terminal 33b may be connected to the terminal 33d when simultaneous transmission of a signal in the band A and a signal in the band B is performed.

This configuration makes it possible to input signals in the band A for uplink MIMO and signals in the bands A and B for uplink CA, which are output from the RFIC 3, selectively to the power amplifiers 21 and 22 by the switching operation of the switch 33 and thereby makes it possible to simplify the radio frequency circuit 1.

For example, the radio frequency circuit 1A according to the variation may further include the matching circuit 41 that is connected between the output terminal of the power amplifier 21 and the switch 32 and has variable impedance. The matching circuit 42 may have the first impedance when a primary signal in the band A out of the bands A and B is independently transmitted and may have the second impedance higher than the first impedance when uplink MIMO in the band A is performed.

This configuration makes it possible to reduce ACLR to prioritize the suppression of signal distortion of a high-power signal when a primary signal in the band A is independently transmitted. This configuration also makes it possible to improve the efficiency of a low-power signal when uplink 2×2 MIMO in the band A is performed.

For example, the radio frequency circuit 1A according to the variation may further include the matching circuit 42 that is connected between the output terminal of the power amplifier 22 and the switch 32 and has variable impedance. The matching circuit 42 may be configured to have the third impedance when a primary signal in the band B out of the bands A and B is independently transmitted and may be configured to have the fourth impedance higher than the third impedance when uplink MIMO in the band A is performed.

This configuration makes it possible to reduce ACLR to prioritize the suppression of signal distortion of a high-power signal when a primary signal in the band B is independently transmitted. This configuration also makes it possible to improve the efficiency of a low-power signal when uplink 2×2 MIMO in the band A is performed.

For example, the radio frequency circuit 1 of the present embodiment may further include the switch 31 that includes the terminals 31a, 31b, 31c, 31d, and 31e, can simultaneously connect the terminal 31a to the terminal 31c and the terminal 31b to the terminal 31d, and can simultaneously connect the terminal 31a to the terminal 31c and the terminal 31b to the terminal 31e. The terminal 31a may be connected to the antenna 2a, the terminal 31b may be connected to the antenna 2b, the terminal 31c may be connected to the filter 11, the terminal 31d may be connected to the filter 12, and the terminal 31e may be connected to the filter 13.

For example, in the radio frequency circuit 1 of the present embodiment, the terminal 31a may be connected to the terminal 31c and the terminal 31b may be connected to the terminal 31e when uplink MIMO in the band A is performed; and the terminal 31a may be connected to the terminal 31c and the terminal 31b may be connected to the terminal 31d when simultaneous transmission of a signal in the band A and a signal in the band B is performed.

This configuration makes it possible to transmit signals in the band A for uplink MIMO and signals in the bands A and B for uplink CA, which are output from the RFIC 3, selectively from the antennas 2a and 2b by the switching operation of the switch 31 and thereby makes it possible to simplify the radio frequency circuit 1.

For example, in the radio frequency circuit 1 according to the present embodiment, the band A may belong to the high band group (2.4-2.8 GHz) and the band B may belong to the middle band group (1.5-2.4 GHz).

For example, in the radio frequency circuit 1 according to the present embodiment, the band A may be Band 41 (2496-2690 MHz), and the band B may be Band 40 (2300-2400 MHz).

For example, in the radio frequency circuit 1 according to the present embodiment, the power amplifiers 21 and 22 and the switch 32 may be disposed over the same substrate.

This configuration makes it possible to shorten signal lines connecting the power amplifiers 21 and 22 to the switch 32 and thereby makes it possible to reduce the transmission loss of high-power transmission signals output from the power amplifiers 21 and 22. This in turn makes it possible to reduce the power consumption of the radio frequency circuit 1.

For example, in the radio frequency circuit 1 according to the present embodiment, the power amplifiers 21 and 22, the switches 32 and 33, and the filters 11 through 13 may be disposed over the same substrate.

This configuration makes it possible to further shorten the transmission paths from the power amplifiers 21 and 22 to the filters 11 through 13 and thereby makes it possible to further reduce the transmission loss of high-power transmission signals output from the power amplifiers 21 and 22. Also, this configuration makes it possible to reduce the size of the radio frequency circuit 1.

The communication device 4 according to the present embodiment includes the RFIC 3 that processes radio frequency signals and the radio frequency circuit 1 that transmits radio frequency signals between the RFIC 3 and the antennas 2a and 2b.

This makes it possible to provide the communication device 4 that has the effects of the radio frequency circuit 1 described above.

Second Embodiment

While the radio frequency circuit 1 according to the first embodiment is capable of performing 2×2 MIMO, a radio frequency circuit 1B according to a second embodiment is capable of performing 4×4 MIMO in addition to 2×2 MIMO.

[2 Circuit Configurations of Radio Frequency Circuit 1B and Communication Device 4B]

Figure 7:
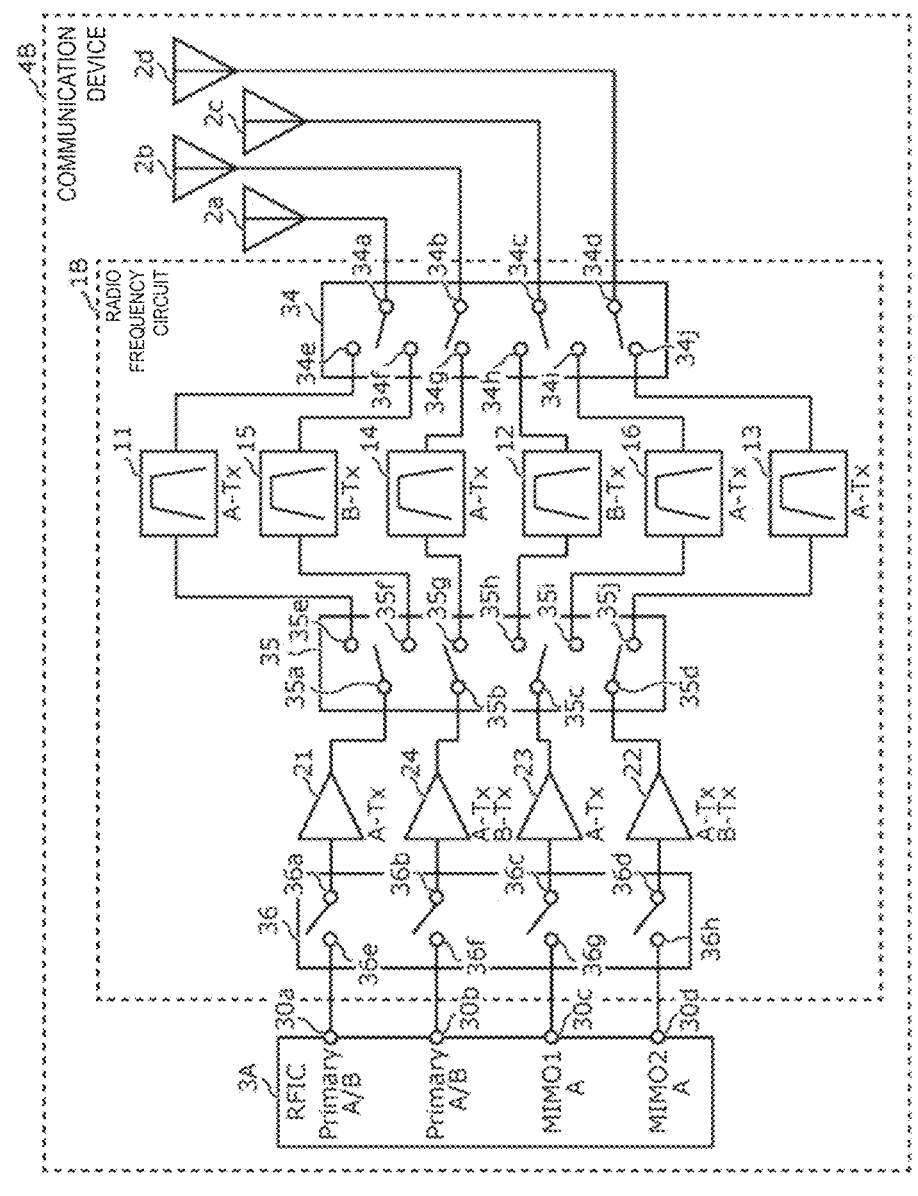
FIG. 7 is a circuit diagram of a radio frequency circuit and a communication device according to a second embodiment.

Circuit configurations of the radio frequency circuit 1B and a communication device 4B according to the present embodiment are described with reference to FIG. 7. FIG. 7 is a circuit diagram of the radio frequency circuit 1B and the communication device 4B according to the second embodiment.

[2.1 Circuit Configuration of Communication Device 4B]

First, a circuit configuration of the communication device 4B is described. As illustrated in FIG. 7, the communication device 4B of the present embodiment includes the radio frequency circuit 1B, antennas 2a, 2b, 2c, and 2d, and an RFIC 3A.

The radio frequency circuit 1B transmits radio frequency signals between the antennas 2a through 2d and the RFIC 3A. The detailed circuit configuration of the radio frequency circuit 1B is described later.

The antennas 2a and 2b are connected to a switch 34 of the radio frequency circuit 1B, transmit radio frequency signals output from the radio frequency circuit 1B, receive radio frequency signals from the outside, and output the received radio frequency signals to the radio frequency circuit 1B.

The RFIC 3A is an example of a signal processing circuit that processes radio frequency signals and has functions similar to the functions of the RFIC 3 according to the first embodiment.

The RFIC 3A includes terminals 30a, 30b, 30c, and 30d. The terminal 30a outputs a primary signal in the band A or B or a MIMO signal in the band A to the radio frequency circuit 1B. The terminal 30b outputs a primary signal in the band A or B or a MIMO signal in the band A to the radio frequency circuit 1B. The terminal 30c outputs a MIMO signal in the band A to the radio frequency circuit 1B. The terminal 30d outputs a MIMO signal in the band A to the radio frequency circuit 1B.

In the communication device 4B according to the present embodiment, the antennas 2a through 2d are not essential components.

[2.2 Circuit Configuration of Radio Frequency Circuit 1B]

Next, a circuit configuration of the radio frequency circuit 1B is described. As illustrated in FIG. 7, the radio frequency circuit 1B includes filters 11, 12, 13, 14, 15, and 16, power amplifiers 21, 22, 23, and 24, and switches 34, 35, and 36.

The radio frequency circuit 1B according to the present embodiment differs from the radio frequency circuit 1 according to the first embodiment in that the power amplifiers 23 and 24 and the filters 14 through 16 are added and in the configurations of the switches 34 through 36. Below, descriptions of components of the radio frequency circuit 1B of the present embodiment corresponding to the components of the radio frequency circuit 1 of the first embodiment are omitted, and differences between the radio frequency circuit 1B and the radio frequency circuit 1 are mainly described.

The filter 11 is an example of a first filter and has a pass band including at least a part of the band A (first band). The filter 11 is connected between the switches 34 and 35.

The filter 12 is an example of a second filter and has a pass band including at least a part of the band B (second band). The filter 12 is connected between the switches 34 and 35.

The filter 13 is an example of a third filter and has a pass band including at least a part of the band A. The filter 13 is connected between the switches 34 and 35.

The filter 14 is an example of a fourth filter and has a pass band including at least a part of the band A. The filter 14 is connected between the switches 34 and 35.

The filter 15 is an example of a fifth filter and has a pass band including at least a part of the band B. The filter 15 is connected between the switches 34 and 35.

The filter 16 is an example of a sixth filter that has a pass band including at least a part of the band A. The filter 16 is connected between the switches 34 and 35.

The power amplifier 21 is an example of a first power amplifier and is capable of amplifying a transmission signal that is in the band A and input from the RFIC 3A via the switch 36. The power amplifier 21 is connected between the switches 35 and 36.

The power amplifier 22 is an example of a second power amplifier and is capable of amplifying transmission signals that are in the bands A and B and input from the RFIC 3A via the switch 36. The power amplifier 22 is connected between the switches 35 and 36.

The power amplifier 23 is an example of a third power amplifier and is capable of amplifying a transmission signal that is in the band A and input from the RFIC 3A via the switch 36. The power amplifier 23 is connected between the switches 35 and 36.

The power amplifier 24 is an example of a fourth power amplifier and is capable of amplifying transmission signals that are in the bands A and B and input from the RFIC 3A via the switch 36. The power amplifier 24 is connected between the switches 35 and 36.

The band A belongs to, for example, the high band group (2.4-2.8 GHz), and the band B belongs to, for example, the middle band group (1.5-2.4 GHz). More specifically, the band A is, for example, Band 41 (2496-2690 MHz), and the band B is, for example, Band 40 (2300-2400 MHz).

The switch 35 is an example of a first switch and includes a terminal 35a (first terminal), a terminal 35b (twelfth terminal), a terminal 35c (eleventh terminal), a terminal 35d (second terminal), a terminal 35e (third terminal), a terminal 35f (fourteenth terminal), a terminal 35g (thirteenth terminal), a terminal 35h (fourth terminal), a terminal 35i (fifteenth terminal), and a terminal 35j (fifth terminal). The terminal 35a is connected to the output terminal of the power amplifier 21, the terminal 35d is connected to the output terminal of the power amplifier 22, the terminal 35c is connected to the output terminal of the power amplifier 23, and the terminal 35b is connected to the output terminal of the power amplifier 24. The terminal 35e is connected to the input terminal of the filter 11, the terminal 35h is connected to the input terminal of the filter 12, the terminal 35j is connected to the input terminal of the filter 13, the terminal 35g is connected to the input terminal of the filter 14, the terminal 35$f$ is connected to the input terminal of the filter 15, and the terminal 35$i$ is connected to the input terminal of the filter 16.

The switch 35 has a configuration capable of simultaneously connecting the terminal 35$a$ to the terminal 35$e$ and the terminal 35$d$ to the terminal 35$h$ and simultaneously connecting the terminal 35$a$ to the terminal 35$e$, the terminal 35$d$ to the terminal 35$j$, the terminal 35$c$ to the terminal 35$g$, and the terminal 35$b$ to the terminal 35$i$. The switch 35 is, for example, a 4 Pole 6 Throw (4P6T) switch circuit.

The switch 36 is an example of a second switch and includes a terminal 36$a$ (sixth terminal), terminals 36$b$, 36$c$, and 36$d$ (seventh terminals), a terminal 36$e$ (eighth terminal), a terminal 36$f$ (ninth terminal), and terminals 36$g$ and 36$h$ (tenth terminals). The terminal 36$a$ is connected to the input terminal of the power amplifier 21, the terminal 36$d$ is connected to the input terminal of the power amplifier 22, the terminal 36$c$ is connected to the input terminal of the power amplifier 23, and the terminal 36$b$ is connected to the input terminal of the power amplifier 24. The terminal 36$e$ is connected to the terminal 30$a$ and receives a primary signal in the band A or B or a MIMO signal in the band A. The terminal 36$f$ is connected to the terminal 30$b$ and receives a primary signal in the band A or B or a MIMO signal in the band A. The terminal 36$g$ is connected to the terminal 30$c$ and receives a MIMO signal in the band A. The terminal 36$h$ is connected to the terminal 30$d$ and receives a MIMO signal in the band A.

The switch 36 has a configuration capable of simultaneously connecting the terminal 36$a$ to the terminal 36$e$ and the terminal 36$d$ to the terminal 36$f$, and simultaneously connecting the terminal 36$a$ to the terminal 36$e$, the terminal 36$b$ to the terminal 36$g$, the terminal 36$c$ to the terminal 36$f$, and the terminal 36$d$ to the terminal 36$h$. The switch 36 is, for example, a 4 Pole 4 Throw (4P4T) switch circuit.

The switch 34 is an example of a third switch and includes a terminal 34$a$ (first antenna connection terminal), a terminal 34$b$ (second antenna connection terminal), a terminal 34$c$ (first antenna connection terminal), a terminal 34$d$ (second antenna connection terminal), a terminal 34$e$ (sixteenth terminal), terminals 34$f$, 34$g$, and 34$h$ (seventeenth terminals), and terminals 34$i$ and 34$j$ (eighteenth terminals). The terminal 34$a$ is connected to the antenna 2$a$, the terminal 34$b$ is connected to the antenna 2$b$, the terminal 34$c$ is connected to the antenna 2$c$, and the terminal 34$d$ is connected to the antenna 2$d$. The terminal 34$e$ is connected to the output terminal of the filter 11, the terminal 34$h$ is connected to the output terminal of the filter 12, the terminal 34$j$ is connected to the output terminal of the filter 13, the terminal 34$g$ is connected to the output terminal of the filter 14, the terminal 34$f$ is connected to the output terminal of the filter 15, and the terminal 34$i$ is connected to the output terminal of the filter 16.

The switch 34 has a configuration capable of simultaneously connecting the terminal 34$a$ to the terminal 34$e$ and the terminal 34$b$ to the terminal 34$h$, and simultaneously connecting the terminal 34$a$ to the terminal 34$e$, the terminal 34$b$ to the terminal 34$g$, the terminal 34$c$ to the terminal 34$i$, and the terminal 34$d$ to the terminal 34$j$. The switch 34 is, for example, a 4P6T switch circuit.

With the above configuration, the radio frequency circuit 1B and the communication device 4B can perform uplink MIMO in the band A and simultaneous transmission of a signal in the band A and a signal in the band B.

In the related-art radio frequency circuit, four or more power amplifiers for amplifying transmission signals in the band A and one or more power amplifiers for amplifying transmission signals in the band B are necessary to perform uplink 4×4 MIMO in the band A and simultaneous transmission of signals in the band A and the band B.

In contrast, in the radio frequency circuit 1B according to the second embodiment, each of the power amplifiers 22 and 24 serves both as a power amplifier for amplifying a MIMO signal in the band A and a power amplifier for amplifying a primary signal in the band B. This configuration makes it possible to reduce the number of power amplifiers in the radio frequency circuit 1B and thereby makes it possible to reduce the size of the radio frequency circuit 1B.

[2.3 Circuit Connection State of Radio Frequency Circuit 1B]

Next, circuit connection states of the radio frequency circuit 1B corresponding to signal transmission modes are described. Signal transmission modes supported by the radio frequency circuit 1B of the present embodiment include: (1) independent transmission of a primary signal in the band A, (2) independent transmission of a primary signal in the band B, (3) simultaneous transmission (ENDC) of a 4G signal in the band A and a 5G signal in the band A, (4) simultaneous transmission (ENDC) of a 4G signal in the band B and a 5G signal in the band B, (5) simultaneous transmission of a primary signal in the band A and a primary signal in the band B (uplink 2CA), (6) simultaneous transmission of uplink 2CA in the bands A and B and uplink 2×2 MIMO in the band A, and (7) MIMO transmission (uplink 4×4 MIMO) in the band A.

Figure 8:
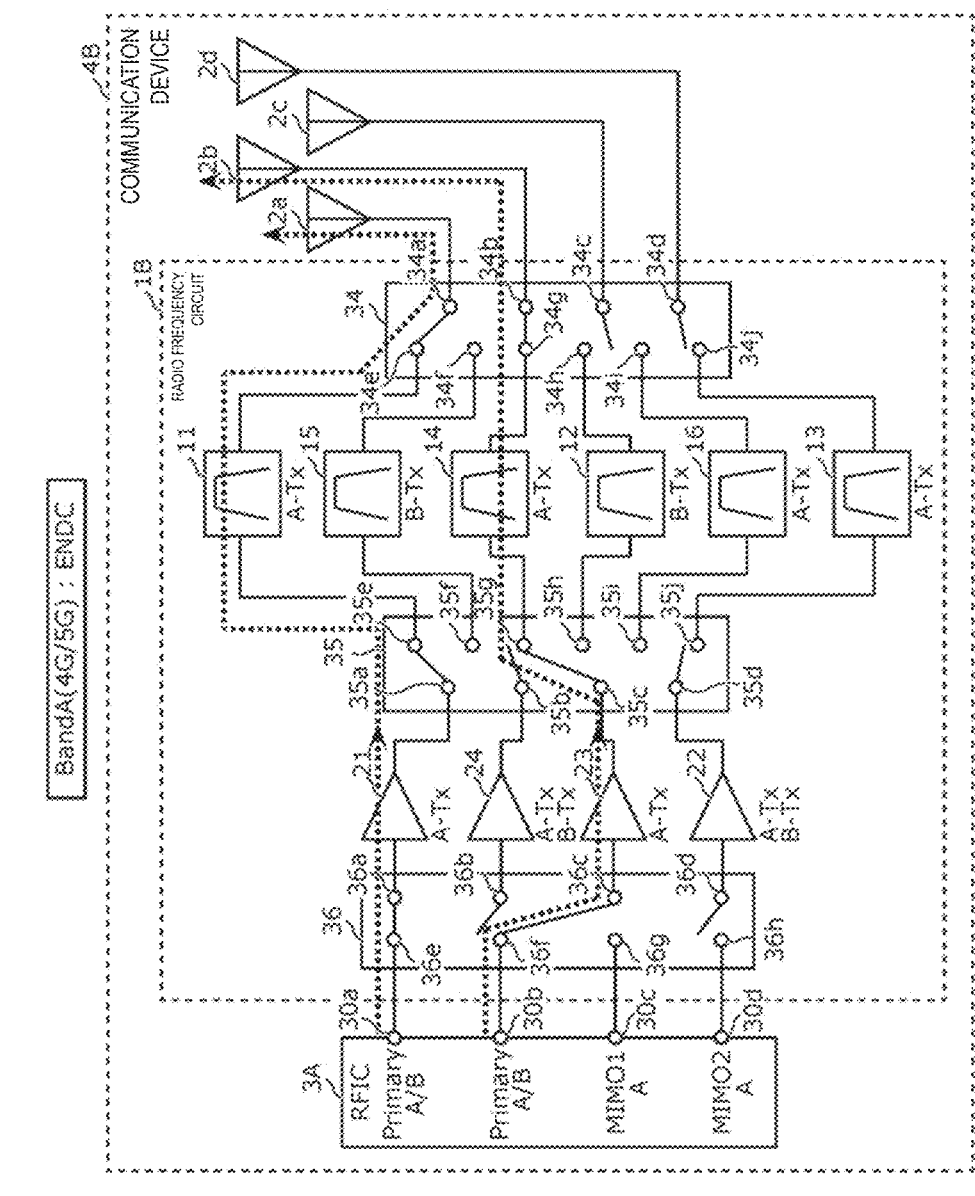
FIG. 8 is a circuit state diagram of the radio frequency circuit and the communication device in the case of uplink 2 E-UTRA NR Dual Connectivity (2ENDC) according to the second embodiment.
Figure 9:
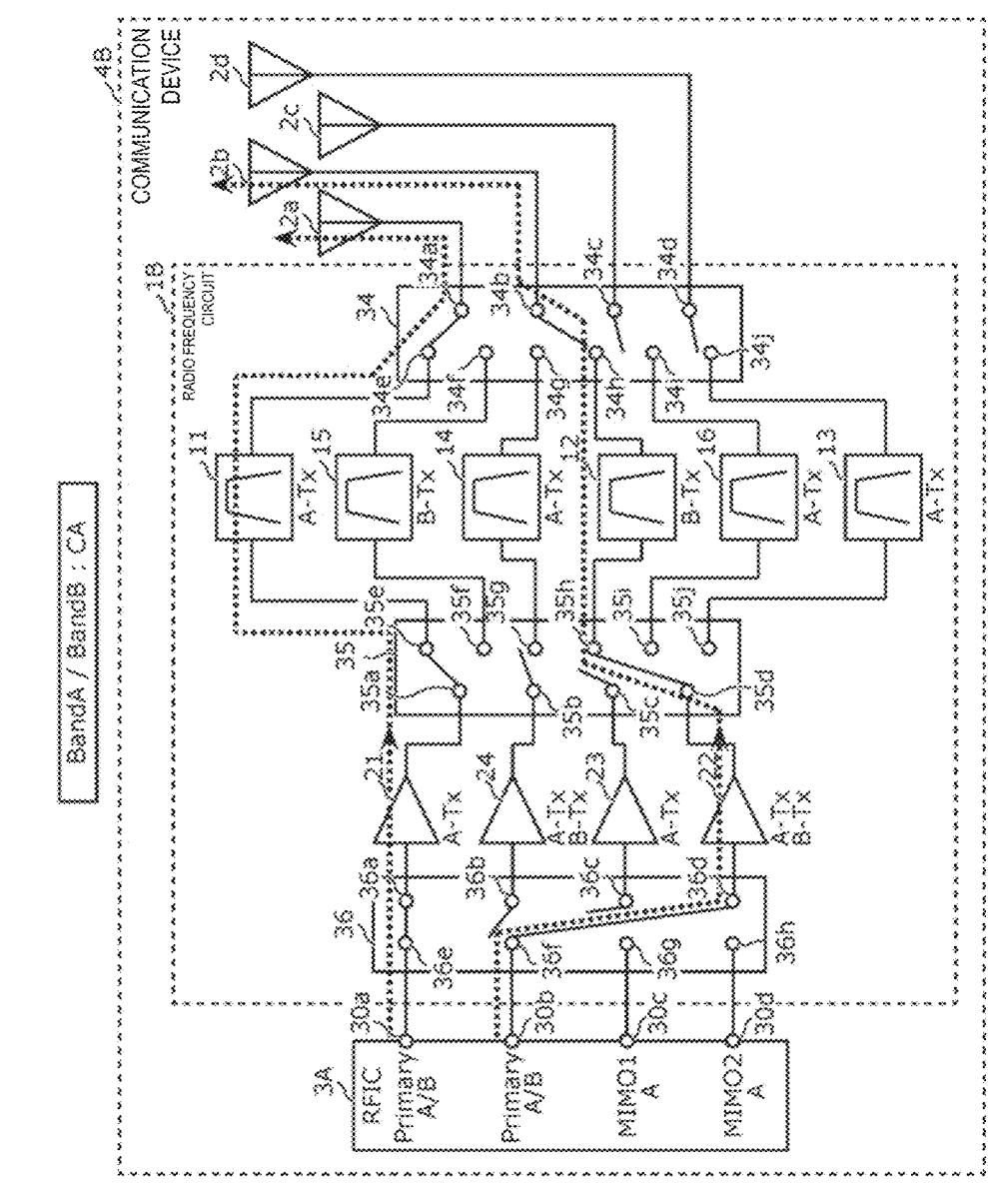
FIG. 9 is a circuit state diagram of the radio frequency circuit and the communication device in the case of uplink 2CA according to the second embodiment.
Figure 10:
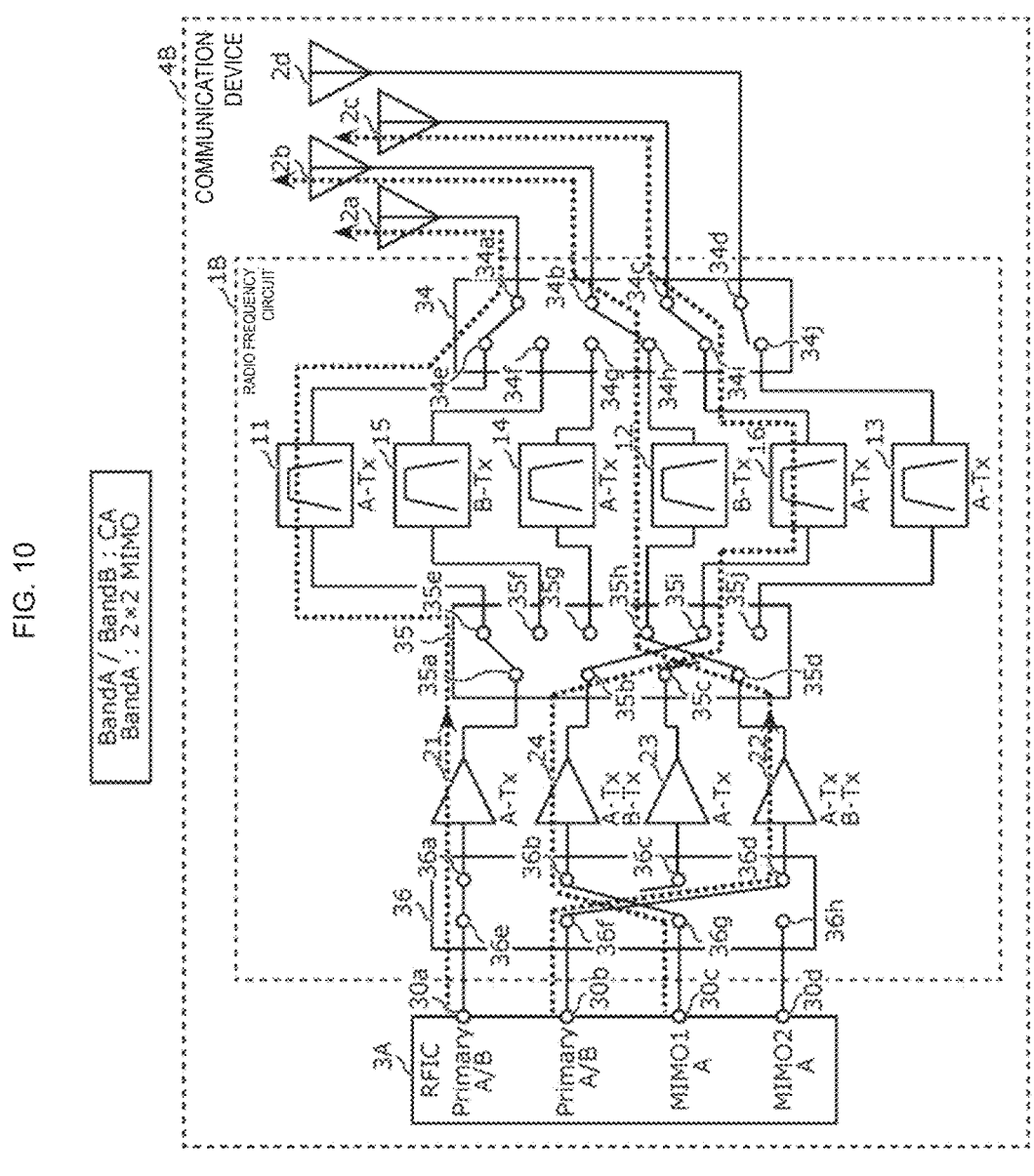
FIG. 10 is a circuit state diagram of the radio frequency circuit and the communication device in the case of uplink 2CA and uplink 2×2 MIMO according to the second embodiment.
Figure 11:
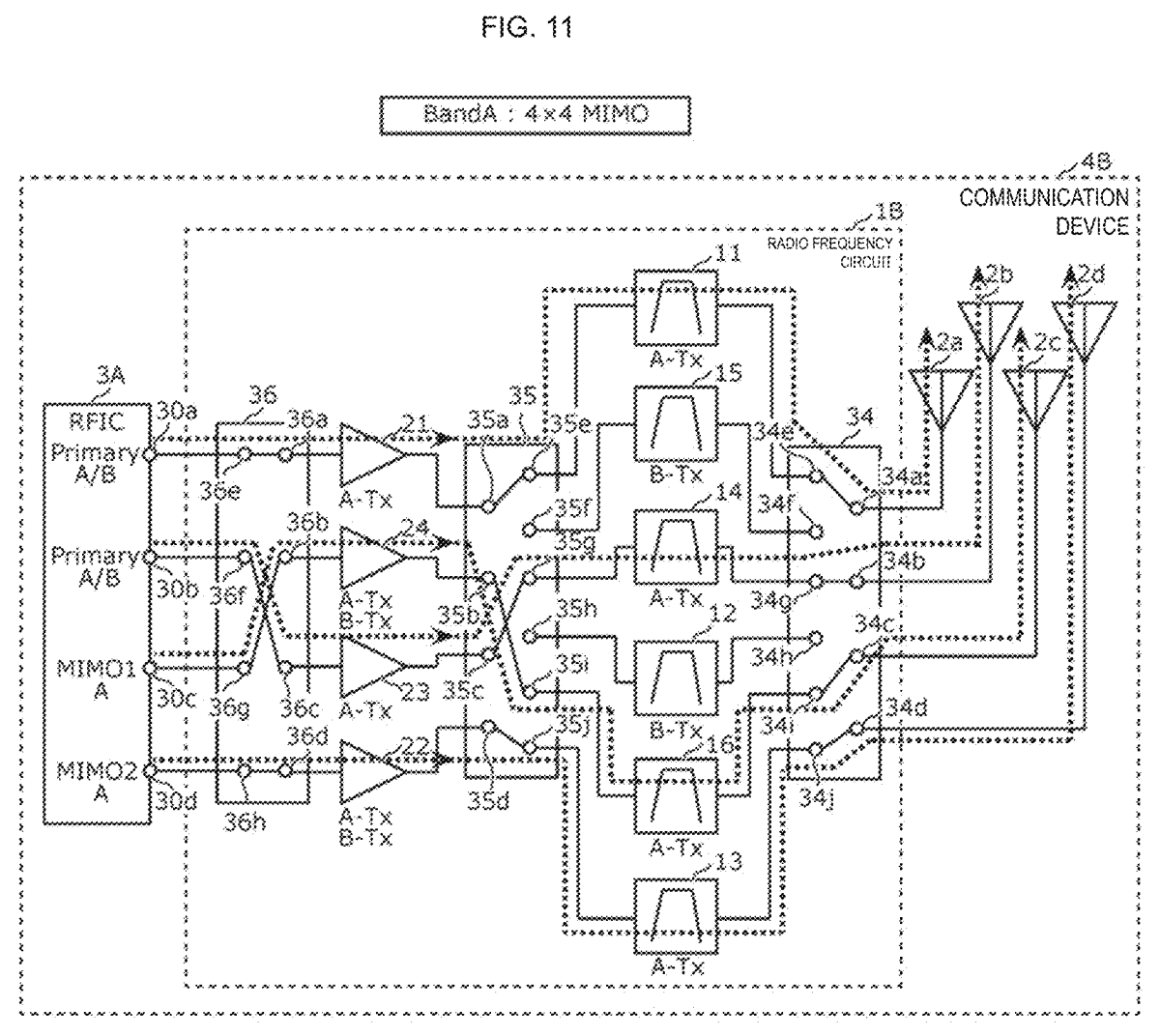

FIG. 8 is a circuit state diagram of the radio frequency circuit 1A and the communication device 4B in the case of uplink 2ENDC according to the second embodiment. FIG. 9 is a circuit state diagram of the radio frequency circuit 1B and the communication device 4B in the case of uplink 2CA according to the second embodiment. FIG. 10 is a circuit state diagram of the radio frequency circuit 1B and the communication device 4B in the case of uplink 2CA and uplink 2×2 MIMO according to the second embodiment. FIG. 11 is a circuit state diagram of the radio frequency circuit 1B and the communication device 4B in the case of uplink 4×4 MIMO according to the second embodiment.

First, (1) when a primary signal in the band A is transmitted independently, in FIG. 7, the terminal 36$a$ is connected to the terminal 36$e$, the terminal 35$a$ is connected to the terminal 35$e$, and the terminal 34$a$ is connected to the terminal 34$e$. In this case, a transmission signal in the band A is transmitted through a transmission path formed by the RFIC 3A, the switch 36, the power amplifier 21, the switch 35, the filter 11, the switch 34, and the antenna 2$a$.

Next, (2) when a primary signal in the band B is transmitted independently, in FIG. 7, the terminal 36$b$ is connected to the terminal 36$e$, the terminal 35$b$ is connected to the terminal 35$f$, and the terminal 34$a$ is connected to the terminal 34$f$. In this case, a transmission signal in the band B is transmitted through a transmission path formed by the RFIC 3A, the switch 36, the power amplifier 24, the switch 35, the filter 15, the switch 34, and the antenna 2$a$.

Next, (3) when a 4G signal in the band A and a 5G signal in the band A are simultaneously transmitted (ENDC), as illustrated in FIG. 8, the terminal 36$a$ is connected to the terminal 36$e$, the terminal 35$a$ is connected to the terminal 35$e$, and the terminal 34$a$ is connected to the terminal 34$e$. At the same time, the terminal 36$c$ is connected to the terminal 36$f$, the terminal 35$c$ is connected to the terminal 35$g$, and the terminal 34$b$ is connected to the terminal 34$g$. In this case, the 4G signal in the band A is transmitted through a transmission path (first transmission path) formed by the RFIC 3A, the switch 36, the power amplifier 21, the switch 35, the filter 11, the switch 34, and the antenna 2a. At the same time, the 5G signal in the band A is transmitted through a transmission path (second transmission path) formed by the RFIC 3A, the switch 36, the power amplifier 23, the switch 35, the filter 14, the switch 34, and the antenna 2b.

Alternatively, the 4G signal in the band A may be transmitted through the second transmission path, and the 5G signal in the band A may be transmitted through the first transmission path.

Next, (4) when a 4G signal in the band B and a 5G signal in the band A are transmitted simultaneously (ENDC), in FIG. 1, the terminal 36b is connected to the terminal 36e, the terminal 35b is connected to the terminal 35f, and the terminal 34a is connected to the terminal 34f. At the same time, the terminal 36d is connected to the terminal 36f, the terminal 35d is connected to the terminal 35h, and the terminal 34b is connected to the terminal 34h. In this case, the 4G signal in the band B is transmitted through a transmission path (third transmission path) formed by the RFIC 3A, the switch 36, the power amplifier 24, the switch 35, the filter 15, the switch 34, and the antenna 2a. At the same time, the 5G signal in the band B is transmitted through a transmission path (fourth transmission path) formed by the RFIC 3A, the switch 36, the power amplifier 22, the switch 35, the filter 12, the switch 34, and the antenna 2b.

Alternatively, the 4G signal in the band B may be transmitted through the fourth transmission path, and the 5G signal in the band B may be transmitted through the fourth transmission path.

Next, (5) when a primary signal in the band A and a primary signal in the band B are simultaneously transmitted (uplink 2CA), as illustrated in FIG. 9, the terminal 36a is connected to the terminal 36e, the terminal 35a is connected to the terminal 35e, and the terminal 34a is connected to the terminal 34e. At the same time, the terminal 36d is connected to the terminal 36f, the terminal 35d is connected to the terminal 35h, and the terminal 34b is connected to the terminal 34h. In this case, the primary signal in the band A is transmitted through a transmission path formed by the RFIC 3A, the switch 36, the power amplifier 21, the switch 35, the filter 11, the switch 34, and the antenna 2a; and at the same time, the primary signal in the band B is transmitted through a transmission path formed by the RFIC 3A, the switch 36, the power amplifier 22, the switch 35, the filter 12, the switch 34, and the antenna 2b.

Next, (6) in the case of simultaneous transmission of uplink 2CA in the bands A and B and uplink 2×2 MIMO in the band A, as illustrated in FIG. 10, the terminal 36a is connected to the terminal 36e, the terminal 35a is connected to the terminal 35e, and the terminal 34a is connected to the terminal 34e. At the same time, the terminal 36b is connected to the terminal 36g, the terminal 35b is connected to the terminal 35i, and the terminal 34c is connected to the terminal 34i. Also, at the same time, the terminal 36d is connected to the terminal 36f, the terminal 35d is connected to the terminal 35h, and the terminal 34b is connected to the terminal 34h. In this case, the primary signal in the band A is transmitted through a transmission path formed by the RFIC 3A, the switch 36, the power amplifier 21, the switch 35, the filter 11, the switch 34, and the antenna 2a. At the same time, the primary signal in the band B is transmitted through a transmission path formed by the RFIC 3A, the switch 36, the power amplifier 22, the switch 35, the filter 12, the switch 34, and the antenna 2b. Also, at the same time, a MIMO signal in the band A is transmitted through a transmission path formed by the RFIC 3A, the switch 36, the power amplifier 24, the switch 35, the filter 16, the switch 34, and the antenna 2c.

Next, (7) in the case of MIMO transmission (uplink 4×4 MIMO) in the band A, as illustrated in FIG. 11, the terminal 36a is connected to the terminal 36e, the terminal 35a is connected to the terminal 35e, and the terminal 34a is connected to the terminal 34e. At the same time, the terminal 36b is connected to the terminal 36g, the terminal 35b is connected to the terminal 35i, and the terminal 34c is connected to the terminal 34i. At the same time, the terminal 36c is connected to the terminal 36f, the terminal 35c is connected to the terminal 35g, and the terminal 34b is connected to the terminal 34g. Also, at the same time, the terminal 36d is connected to the terminal 36h, the terminal 35d is connected to the terminal 35j, and the terminal 34d is connected to the terminal 34j. In this case, a MIMO signal in the band A is transmitted through a transmission path formed by the RFIC 3A, the switch 36, the power amplifier 21, the switch 35, the filter 11, the switch 34, and the antenna 2a. At the same time, a MIMO signal in the band A is transmitted through a transmission path formed by the RFIC 3A, the switch 36, the power amplifier 24, the switch 35, the filter 16, the switch 34, and the antenna 2c. At the same time, a MIMO signal in the band A is transmitted through a transmission path formed by the RFIC 3A, the switch 36, the power amplifier 23, the switch 35, the filter 14, the switch 34, and the antenna 2b. Also, at the same time, a MIMO signal in the band A is transmitted through a transmission path formed by the RFIC 3A, the switch 36, the power amplifier 22, the switch 35, the filter 13, the switch 34, and the antenna 2d.

Here, when the terminal 35d is connected to the terminal 35j, the terminal 35a is always connected to the terminal 35e. Also, when the terminal 35b is connected to the terminal 35j, the terminal 35a is always connected to the terminal 35e. Because the filters 13 and 16 are dedicated for MIMO, the filter 11 is always used for MIMO when the filter 13 is used, and the filter 11 is always used for MIMO when the filter 16 is used.

[2.4 Module Configuration of Radio Frequency Circuit 1B]

In the radio frequency circuit 1B according to the present embodiment, the power amplifiers 21 through 24 and the switch 35 are disposed over the same first substrate.

This configuration makes it possible to shorten signal lines connecting the power amplifiers 21 through 24 to the switch 35 and thereby makes it possible to reduce the transmission loss of high-power transmission signals output from the power amplifiers 21 through 24. This in turn makes it possible to reduce the power consumption of the radio frequency circuit 1B.

The switches 34 and 36 may be disposed over the first substrate together with the switch 35. Also, the switches 34, 35, and 36 may be included in the same semiconductor IC. This makes it possible to reduce the size of the radio frequency circuit 1B.

Also, in the radio frequency circuit 1B according to the present embodiment, the filters 11 through 16 may be disposed over the first substrate in addition to the power amplifiers 21 through 24 and the switches 34 through 36.

This configuration makes it possible to shorten the transmission paths from the power amplifiers 21 through 24 to the switch 34 and thereby makes it possible to further reduce the transmission loss of high-power transmission signals output from the power amplifiers 21 through 24. Also, this configuration makes it possible to reduce the size of the radio frequency circuit 1B.

[2.5 Impedance Matching of Radio Frequency Circuit 1B]

In the radio frequency circuit 1B according to the present embodiment, a third matching circuit with variable impedance may be connected between the output terminal of the power amplifier 21 and the switch 35. The third matching circuit includes at least one of an inductor and a capacitor. Also, a fourth matching circuit with variable impedance may be connected between the output terminal of the power amplifier 24 and the switch 35. The fourth matching circuit includes at least one of an inductor and a capacitor.

Here, (1) when a primary signal in the band A out of the bands A and B is independently transmitted, the third matching circuit is configured to have a fifth impedance. Also, (5) when a signal in band A and a signal in the band B are simultaneously transmitted (uplink 2CA) or (6) when uplink 2×2 MIMO in the band A is performed, the third matching circuit is configured to have a sixth impedance higher than the fifth impedance. Also, (7) when uplink 4×4 MIMO in the band A is performed, the third matching circuit is configured to have a seventh impedance higher than the sixth impedance.

When a primary signal in the band A is independently transmitted, the output power of the primary signal is, for example, about 26 dBm. Also, in uplink 2CA of signals in the bands A and B and uplink 2×2 MIMO in the band A, the output power of each MIMO signal is, for example, about 23 dBm. Also, in uplink 4×4 MIMO in the band A, the output power of each MIMO signal is, for example, about 20 dBm.

In this point of view, in independent transmission of a primary signal in the band A, it is preferable to match the output impedance of the power amplifier 21 to a relatively low impedance (fifth impedance) to prioritize the suppression of signal distortion of a high-power signal. In contrast, in uplink 4×4 MIMO in the band A, it is preferable to match the output impedance of the power amplifier 21 to a relatively high impedance (seventh impedance) to prioritize the efficiency of a low-power signal. Also, in uplink 2CA of signals in the bands A and B and uplink 2×2 MIMO in the band A, it is preferable to match the output impedance of the power amplifier 21 to an impedance (sixth impedance) between the fifth impedance and the seventh impedance.

Also, (2) when a primary signal in the band B out of the bands A and B is independently transmitted, the fourth matching circuit is configured to have an eighth impedance. Also, (5) when signals in the bands A and B are simultaneously transmitted (uplink 2CA) or (6) when uplink 2×2 MIMO in the band A is performed, the fourth matching circuit is configured to have a ninth impedance higher than the eighth impedance. Also, (7) when uplink 4×4 MIMO in the band A is performed, the fourth matching circuit is configured to have a tenth impedance higher than the ninth impedance.

In independent transmission of a primary signal in the band B, the output power of the primary signal is, for example, about 26 dBm. In uplink 2CA of signals in the bands A and B and uplink 2×2 MIMO in the band A, the output power of each MIMO signal is, for example, about 23 dBm. Also, in uplink 4×4 MIMO in the band A, the output power of each MIMO signal is, for example, about 20 dBm.

In this point of view, in independent transmission of a primary signal in the band B, it is preferable to match the output impedance of the power amplifier 24 to a relatively low impedance (eighth impedance) to prioritize the suppression of signal distortion of a high-power signal. In contrast, in uplink 4×4 MIMO in the band A, it is preferable to match the output impedance of the power amplifier 24 to a relatively high impedance (tenth impedance) to prioritize the efficiency of a low-power signal. Also, in uplink 2CA of signals in the bands A and B and uplink 2×2 MIMO in the band A, it is preferable to match the output impedance of the power amplifier 24 to an impedance (ninth impedance) between the eighth impedance and the tenth impedance.

[2.6 Effects of Radio Frequency Circuit and Communication]Device According to First Embodiment B As described above, the radio frequency circuit 1B of the present embodiment is capable of performing uplink MIMO in the band A and simultaneous transmission of a signal in the band A and a signal in the band B. The radio frequency circuit 1B includes the power amplifier 21 capable of amplifying a signal in the band A; the power amplifier 22 capable of amplifying the signal in the band A and the signal in the band B; the filter 11 having a pass band including at least a part of the band A; the filter 12 having a pass band including at least a part of the band B; the filter 13 that is different from the filter 11 and has a pass band including at least a part of the band A; and the switch 35 that includes the terminals 35a, 35d, 35e, 35h, and 35j, can simultaneously connect the terminal 35a to the terminal 35e and the terminal 35d to the terminal 35h, and can simultaneously connect the terminal 35a to the terminal 35e and the terminal 35d to the terminal 35j. The terminal 35a is connected to the output terminal of the power amplifier 21, the terminal 35d is connected to the output terminal of the power amplifier 22, the terminal 35e is connected to the filter 11, the terminal 35h is connected to the filter 12, and the terminal 35j is connected to the filter 13.

With this configuration, the power amplifier 22 serves both as a power amplifier for amplifying MIMO signals in the band A and a power amplifier for amplifying primary signals in the band B. This configuration makes it possible to reduce the number of power amplifiers and thereby makes it possible to reduce the size of the radio frequency circuit 1B. Thus, the present embodiment makes it possible to provide the radio frequency circuit 1B that is small and capable of transmitting MIMO and non-MIMO radio frequency signals.

For example, the radio frequency circuit 1B of the present embodiment may further include the power amplifier 23 capable of amplifying a signal in the band A, the power amplifier 24 capable of amplifying a signal in the band A and a signal in the band B, the filter 14 having a pass band including at least a part of the band A, the filter 15 having a pass band including at least a part of the band B, and the filter 16 having a pass band including at least a part of the band A. The switch 35 may further include the terminals 35c, 35b, 35g, 35f, and 35i and may be capable of simultaneously connecting the terminal 35a to the terminal 35e and the terminal 35d to the terminal 35h, simultaneously connecting the terminal 35a to the terminal 35e and the terminal 35d to the terminal 35j, and simultaneously connecting the terminal 35c to the terminal 35g and the terminal 35b to the terminal 35i. The terminal 35c may be connected to the output terminal of the power amplifier 23, the terminal 35b may be connected to the output terminal of the power amplifier 24, the terminal 35g may be connected to the filter 14, the terminal 35f may be connected to the filter 15, and the terminal 35i may be connected to the filter 16.

For example, in the radio frequency circuit 1B of the present embodiment, when uplink 4×4 MIMO in the band A is performed, the terminal 35a may be connected to the terminal 35e, the terminal 35d may be connected to the terminal 35j, the terminal 35c may be connected to the terminal 35g, and the terminal 35b may be connected to the terminal 35i; and when simultaneous transmission of a signal in the band A and a signal in the band B is performed, the terminal 35a may be connected to the terminal 35e and the terminal 35d may be connected to the terminal 35h.

This configuration makes it possible to achieve both uplink 4×4 MIMO in the band A and uplink CA of signals in the bands A and B by the switching operation of the switch 35 and thereby makes it possible to simplify the radio frequency circuit 1B.

For example, in the radio frequency circuit 1B of the present embodiment, when simultaneous transmission of a signal in the band A for 4G-LTE and a signal in the band A for 5G-NR is performed, the terminal 35a may be connected to the terminal 35e and the terminal 35c may be connected to the terminal 35g.

This configuration makes it possible to achieve ENDC in the band A by the switching operation of the switch 35 and thereby makes it possible to simplify the radio frequency circuit 1B.

For example, in the radio frequency circuit 1B according to the present embodiment, uplink 2×2 MIMO in the band A and simultaneous transmission of a signal in the band A and a signal in the band B are performed at the same time, the terminal 35a may be connected to the terminal 35e, the terminal 35d may be connected to the terminal 35h, and the terminal 35b may be connected to the terminal 35i.

This configuration makes it possible to concurrently perform uplink 2×2 MIMO in the band A and simultaneous transmission of a signal in the band A and a signal in the band B by the switching operation of the switch 35 and thereby makes it possible to simplify the radio frequency circuit 1B.

For example, the radio frequency circuit 1B according to the variation may further include a third matching circuit that is connected between the output terminal of the power amplifier 21 and the switch 35 and has variable impedance. In this case, when a primary signal in the band A out of the bands A and B is independently transmitted, the third matching circuit may be configured to have a fifth impedance; when uplink CA of a signal in the band A and a signal in the band B or uplink 2×2 MIMO in the band A is performed, the third matching circuit may be configured to have a sixth impedance higher than the fifth impedance; and when uplink 4×4 MIMO in the band A is performed, the third matching circuit may be configured to have a seventh impedance higher than the sixth impedance.

This configuration makes it possible to reduce ACLR to prioritize the suppression of signal distortion of a high-power signal when a primary signal in the band A is independently transmitted. This configuration also makes it possible to improve the efficiency of a low-power signal when uplink 4×4 MIMO in the band A is performed.

For example, the radio frequency circuit 1B according to the variation may further include a fourth matching circuit that is connected between the output terminal of the power amplifier 24 and the switch 35 and has variable impedance. In this case, when a primary signal in the band B out of the bands A and B is independently transmitted, the fourth matching circuit may be configured to have an eighth impedance; when uplink CA of a signal in the band A and a signal in the band B or uplink 2×2 MIMO in the band A is performed, the fourth matching circuit may be configured to have a ninth impedance higher than the eighth impedance; and when uplink 4×4 MIMO in the band A is performed, the fourth matching circuit may be configured to have a tenth impedance higher than the ninth impedance.

This configuration makes it possible to reduce ACLR to prioritize the suppression of signal distortion of a high-power signal when a primary signal in the band B is independently transmitted. This configuration also makes it possible to improve the efficiency of a low-power signal when uplink 4×4 MIMO in the band A is performed.

For example, the radio frequency circuit 1B of the present embodiment may further include the switch 34 that includes the terminals 34a, 34b, 34e, 34h, and 34j, can simultaneously connect the terminal 34a to the terminal 34e and the terminal 34b to the terminal 34h, and can simultaneously connect the terminal 34a to the terminal 34e and the terminal 34b to the terminal 34j. The terminal 34a may be connected to the antenna 2a, the terminal 34b may be connected to the antenna 2b, the terminal 34e may be connected to the filter 11, the terminal 34h may be connected to the filter 12, and the terminal 34j may be connected to the filter 13.

For example, in the radio frequency circuit 1B of the present embodiment, the terminal 34a may be connected to the terminal 34e, the terminal 34d may be connected to the terminal 34j, the terminal 34c may be connected to the terminal 34i, and the terminal 34b may be connected to the terminal 34g when uplink MIMO in the band A is performed; and the terminal 34a may be connected to the terminal 34e and the terminal 34b may be connected to the terminal 34h when simultaneous transmission of a signal in the band A and a signal in the band B is performed.

This configuration makes it possible to transmit signals in the band A for uplink 4×4 MIMO and signals in the bands A and B for uplink CA, which are output from the RFIC 3A, selectively from the antennas 2a through 2d by the switching operation of the switch 34 and thereby makes it possible to simplify the radio frequency circuit 1B.

For example, in the radio frequency circuit 1B according to the present embodiment, the band A may belong to the high band group (2.4-2.8 GHz) and the band B may belong to the middle band group (1.5-2.4 GHz).

For example, in the radio frequency circuit 1B according to the present embodiment, the band A may be Band 41 (2496-2690 MHz), and the band B may be Band 40 (2300-2400 MHz).

For example, in the radio frequency circuit 1B according to the present embodiment, the power amplifiers 21 through 24 and the switch 35 may be disposed over the same substrate.

This configuration makes it possible to shorten signal lines connecting the power amplifiers 21 through 24 to the switch 35 and thereby makes it possible to reduce the transmission loss of high-power transmission signals output from the power amplifiers 21 through 24. This in turn makes it possible to reduce the power consumption of the radio frequency circuit 1B.

For example, in the radio frequency circuit 1B according to the present embodiment, the power amplifiers 21 through 24, the switches 35 and 36, and the filters 11 through 16 may be disposed over the same substrate.

This configuration makes it possible to shorten the transmission paths from the power amplifiers 21 through 24 to the filters 11 through 16 and thereby makes it possible to further reduce the transmission loss of high-power transmission signals output from the power amplifiers 21 through 24. Also, this configuration makes it possible to reduce the size of the radio frequency circuit 1B.

The communication device 4B of the present embodiment includes the RFIC 3A that processes radio frequency signals and the radio frequency circuit 1B that transmits radio frequency signals between the RFIC 3A and the antennas 2a through 2d.

This makes it possible to provide the communication device 4B having the effects of the radio frequency circuit 1B described above.

(Variations)

Radio frequency circuits and communication devices according to the present disclosure are described above based on embodiments and a variation. However, the present disclosure is not limited to the radio frequency circuits and the communication devices of the embodiments and the variation described above. The present disclosure may also include other embodiments implemented by combining components in the embodiments and the variation described above, variations obtained by making various modifications conceivable by a person skilled in the art to the embodiments and the variation without departing from the spirit of the present disclosure, and various devices including the radio frequency circuits described above.

For example, in the circuit configurations of the radio frequency circuits and the communication devices according to the embodiments and the variation described above, another circuit element and/or a wire may be inserted in a path connecting circuit elements or signal paths illustrated in the drawings. For example, in the radio frequency circuit 1, matching circuits may be inserted between the power amplifiers 21 and 22 and the switch 33 and/or between the filters 11 through 13 and the switch 31.

Although a 2 uplink configuration for simultaneously transmitting a signal in the band A and a signal in the band B is used in the embodiments and the variation described above, the configurations of the radio frequency circuits and the communication devices according to the present disclosure may also be applied to an uplink and/or downlink configuration (e.g., 3 uplink 3 downlink configuration) that uses three or more different frequency bands at the same time. That is, the present disclosure also includes a radio frequency front-end module or a communication device that has a configuration for performing uplink and/or downlink communication using three or more different frequency bands at the same time and that includes a configuration of any of the radio frequency front-end modules and the communication devices according to the embodiments and the variation described above.

Although configurations for performing uplink 2×2 MIMO and uplink 4×4 MIMO in the band A are used in the embodiments and the variation described above, the configurations of the radio frequency circuits and the communication devices according to the present disclosure may also be applied to, for example, configurations for 8×8 MIMO and 16×16 MIMO.

INDUSTRIAL APPLICABILITY

The present disclosure can be widely used for communication devices, such as mobile phones, as a multi-band/multi-mode front-end module employing MIMO and carrier aggregation technologies.

REFERENCE SIGNS LIST

1, 1A, 1B, 301 radio frequency circuit
2a, 2b, 2c, 2d antenna
3, 3A RF signal processing circuit (RFIC)
4, 4A, 4B, 304 communication device
11, 12, 13, 14, 15, 16 filter
21, 22, 23, 24, 322, 323 power amplifier
31, 32, 33, 34, 35, 36, 332, 333 switch

30a, 30b, 30c, 30d, 31a, 31b, 31c, 31d, 31e, 32a, 32b, 32c, 32d, 32e, 33a, 33b, 33c, 33d, 33e, 34a, 34b, 34c, 34d, 34e, 34f, 34g, 34h, 34i, 34j, 35a, 35b, 35c, 35d, 35e, 35f, 35g, 35h, 35i, 35j, 36a, 36b, 36c, 36d, 36e, 36f, 36g, 36h terminal
41, 42 matching circuit
51 minimum ACLR point
52 maximum efficiency point

The invention claimed is:

1. A radio frequency circuit configured to perform uplink MIMO in a first band as well as simultaneous transmission of a signal in the first band and a signal in a second band, the radio frequency circuit comprising:
   a first power amplifier configured to amplify the signal in the first band;
   a second power amplifier configured to amplify the signal in the first band and the signal in the second band;
   a first filter having a pass band including at least a part of the first band;
   a second filter having another pass band including at least a part of the second band;
   a third filter that has a third pass band that includes at least a part of the first band and that is different from the passband of the first filter; and
   a first switch that includes a first terminal, a second terminal, a third terminal, a fourth terminal, and a fifth terminal and is configured to
      simultaneously connect the first terminal to the third terminal and the second terminal to the fourth terminal, and
      simultaneously connect the first terminal to the third terminal and the second terminal to the fifth terminal, wherein
   the first terminal is connected to an output terminal of the first power amplifier;
   the second terminal is connected to an output terminal of the second power amplifier;
   the third terminal is connected to the first filter;
   the fourth terminal is connected to the second filter; and
      the fifth terminal is connected to the third filter, wherein
   under a condition uplink MIMO is performed in the first band, the first terminal is connected to the third terminal and the second terminal is connected to the fifth terminal; and
   under a condition the simultaneous transmission is performed of the signal in the first band and the signal in the second band, the first terminal is connected to the third terminal and the second terminal is connected to the fourth terminal.

2. The radio frequency circuit according to claim 1, wherein
   under a condition the second terminal is connected to the fifth terminal, the first terminal is also connected to the third terminal.

3. The radio frequency circuit according to claim 1, further comprising:
   a second switch that includes a sixth terminal, a seventh terminal, an eighth terminal, a ninth terminal, and a tenth terminal and is configured to
      simultaneously connect the sixth terminal to the eighth terminal and the seventh terminal to the ninth terminal, and
      simultaneously connect the sixth terminal to the eighth terminal and the seventh terminal to the tenth terminal, wherein
   the sixth terminal is connected to an input terminal of the first power amplifier;

the seventh terminal is connected to an input terminal of the second power amplifier;

the eighth terminal receives the signal in the first band;

the ninth terminal receives the signal in the second band; and the tenth terminal receives the signal in the first band.

4. The radio frequency circuit according to claim 3, wherein under a condition uplink MIMO is performed in the first band, the sixth terminal is connected to the eighth terminal and the seventh terminal is connected to the tenth terminal; and under a condition the simultaneous transmission is performed of the signal in the first band and the signal in the second band, the sixth terminal is connected to the eighth terminal and the seventh terminal is connected to the ninth terminal.

5. The radio frequency circuit according to claim 1, further comprising:

a first matching circuit that has variable impedance, and is connected between the output terminal of the first power amplifier and the first switch;

under a condition a primary signal is independently transmitted in the first band out of the first band and the second band, the first matching circuit is configured to have a first impedance; and under a condition uplink MIMO is performed in the first band, the first matching circuit is configured to have a second impedance higher than the first impedance.

6. The radio frequency circuit according to claim 1, further comprising:

a second matching circuit that has variable impedance and is connected between the output terminal of the second power amplifier and the first switch, wherein under a condition a primary signal is independently transmitted in the second band out of the first band and the second band, the second matching circuit is configured to have a third impedance; and under a condition uplink MIMO is performed in the first band, the second matching circuit is configured to have a fourth impedance higher than the third impedance.

7. The radio frequency circuit according to claim 1, further comprising:

a third power amplifier that is different from the first power amplifier and configured to amplify the signal in the first band;

a fourth power amplifier that is different from the second power amplifier and configured to amplify the signal in the first band and the signal in the second band;

a fourth filter that is different from the first filter and has a fourth pass band that includes at least a part of the first band;

a fifth filter that is different from the second filter and has a fifth pass band that includes at least a part of the second band; and a sixth filter that is different from the first filter and the third filter and has a sixth pass band that includes at least a part of the first band, wherein the first switch further includes an eleventh terminal, a twelfth terminal, a thirteenth terminal, a fourteenth terminal, and a fifteenth terminal and is configured to simultaneously connect the first terminal to the third terminal and the second terminal to the fourth terminal, and simultaneously connect the first terminal to the third terminal, the second terminal to the fifth terminal, the eleventh terminal to the thirteenth terminal, and the twelfth terminal to the fifteenth terminal;

the eleventh terminal is connected to an output terminal of the third power amplifier;

the twelfth terminal is connected to an output terminal of the fourth power amplifier;

the thirteenth terminal is connected to the fourth filter;

the fourteenth terminal is connected to the fifth filter; and the fifteenth terminal is connected to the sixth filter.

8. The radio frequency circuit according to claim 7, wherein under a condition uplink 4×4 MIMO is performed in the first band, the first terminal is connected to the third terminal, the second terminal is connected to the fifth terminal, the eleventh terminal is connected to the thirteenth terminal, and the twelfth terminal is connected to the fifteenth terminal; and under a condition the simultaneous transmission is performed of the signal in the first band and the signal in the second band, the first terminal is connected to the third terminal and the second terminal is connected to the fourth terminal.

9. The radio frequency circuit according to claim 8, wherein under a condition simultaneous transmission is performed of a signal in the first band for 4G-LTE and a signal in the first band for 5G-NR, the first terminal is connected to the third terminal and the eleventh terminal is connected to the thirteenth terminal.

10. The radio frequency circuit according to claim 8, wherein under a condition uplink 2×2 MIMO in the first band and the simultaneous transmission of the signal in the first band and the signal in the second band are performed concurrently, the first terminal is connected to the third terminal, the second terminal is connected to the fourth terminal, and the twelfth terminal is connected to the fifteenth terminal.

11. The radio frequency circuit according to claim 7, further comprising:

a third matching circuit that is connected between the output terminal of the third power amplifier and the first switch and has variable impedance, wherein under a condition a primary signal is independently transmitted in the first band out of the first band and the second band, the third matching circuit is configured to have a fifth impedance;

under a condition uplink 2×2 MIMO is performed in the first band or the simultaneous transmission of the signal in the first band and the signal in the second band, the third matching circuit is configured to have a sixth impedance higher than the fifth impedance; and under a condition uplink 4×4 MIMO is performed in the first band, the third matching circuit is configured to have a seventh impedance higher than the sixth impedance.

12. The radio frequency circuit according to claim 7, further comprising:

a fourth matching circuit that is connected between the output terminal of the fourth power amplifier and the first switch and has variable impedance, wherein under a condition a primary signal is independently transmitted in the second band out of the first band and the second band, the fourth matching circuit is configured to have an eighth impedance;

under a condition uplink 2×2 MIMO is performed in the first band or the simultaneous transmission of the signal in the first band and the signal in the second band, the fourth matching circuit is configured to have a ninth impedance higher than the eighth impedance; and under a condition uplink 4×4 MIMO is performed in the first band, the fourth matching circuit is configured to have a tenth impedance higher than the ninth impedance.

13. The radio frequency circuit according to claim 1, further comprising:

a third switch that includes a first antenna connection terminal, a second antenna connection terminal, a sixteenth terminal, a seventeenth terminal, and an eighteenth terminal and is configured to simultaneously connect the first antenna connection terminal to the sixteenth terminal and the second antenna connection terminal to the seventeenth terminal and simultaneously connect the first antenna connection terminal to the sixteenth terminal and the second antenna connection terminal to the eighteenth terminal, wherein the first antenna connection terminal is connected to the first antenna;

the second antenna connection terminal is connected to the second antenna;

the sixteenth terminal is connected to the first filter;

the seventeenth terminal is connected to the second filter; and the eighteenth terminal is connected to the third filter.

14. The radio frequency circuit according to claim 13, wherein is performed uplink MIMO is performed in the first band, the first antenna connection terminal is connected to the sixteenth terminal and the second antenna connection terminal is connected to the eighteenth terminal; and under a condition the simultaneous transmission is performed of the signal in the first band and the signal in the second band, the first antenna connection terminal is connected to the sixteenth terminal and the second antenna connection terminal is connected to the seventeenth terminal.

15. The radio frequency circuit according to claim 1, wherein the first band belongs to a high band group (2.4-2.8 GHz); and the second band belongs to a middle band group (1.5-2.4 GHz).

16. The radio frequency circuit according to claim 15, wherein the first band is Band 41 (2496-2690 MHz); and the second band is Band 40 (2300-2400 MHz).

17. The radio frequency circuit according to claim 1, wherein the first power amplifier, the second power amplifier, and the first switch are disposed over a same substrate.

18. The radio frequency circuit according to claim 3, wherein the first power amplifier, the second power amplifier, the first switch, the second switch, the first filter, the second filter, and the third filter are disposed over a same substrate.

19. A communication device comprising:

a signal processing circuit that processes a radio frequency signal; and the radio frequency circuit according to claim 1 that conveys the radio frequency signal between the signal processing circuit and an antenna.

* * * * *